United States Patent
Farajidana et al.

(10) Patent No.: US 9,137,821 B2
(45) Date of Patent: Sep. 15, 2015

(54) FLEXIBLE SIGNALING OF RESOURCES ON A CONTROL CHANNEL

(75) Inventors: Amir Farajidana, San Diego, CA (US); Durga Prasad Malladi, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 984 days.

(21) Appl. No.: 12/113,808

(22) Filed: May 1, 2008

(65) Prior Publication Data

US 2009/0325585 A1    Dec. 31, 2009

Related U.S. Application Data

(60) Provisional application No. 60/915,660, filed on May 2, 2007.

(51) Int. Cl.
*H04W 72/00* (2009.01)
*H04W 72/14* (2009.01)

(52) U.S. Cl.
CPC ..................... *H04W 72/14* (2013.01)

(58) Field of Classification Search
USPC ........................................................ 370/329
See application file for complete search history.

(56) References Cited

U.S. PATENT DOCUMENTS

| | | | |
|---|---|---|---|
| 7,636,328 B2 | 12/2009 | Teague et al. | |
| 7,903,615 B2 | 3/2011 | Gorokhov et al. | |
| 8,693,405 B2 | 4/2014 | Ji et al. | |
| 2007/0110104 A1 | 5/2007 | Sartori et al. | |
| 2008/0090583 A1* | 4/2008 | Wang et al. | 455/452.1 |
| 2008/0159323 A1* | 7/2008 | Rinne et al. | 370/431 |

FOREIGN PATENT DOCUMENTS

| | | |
|---|---|---|
| EP | 1389885 | 2/2004 |
| JP | 2002513256 A | 5/2002 |
| JP | 2005117579 A | 4/2005 |
| JP | 2007060642 A | 3/2007 |

(Continued)

OTHER PUBLICATIONS

Uplink Resource Allocation for E-UTRA, Source: NEC Group, NTT DoCoMo, Published: Oct. 2006, TSG-RAN WG1#46bis, R1-062773.*

(Continued)

*Primary Examiner* — Sulaiman Nooristany
(74) *Attorney, Agent, or Firm* — Larry Moskowitz

(57) ABSTRACT

Systems and methodologies are described that facilitate employing flexible signaling of resource block assignments on a control channel. Resource blocks associated with an uplink or downlink channel can be split into a plurality of groups, and group-specific signaling constraints can be utilized with each of these groups. For example, the group-specific signaling constraints can relate to minimum resource block allocation units, signaling structures (e.g., bitmap structure, contiguous allocation structure, tree-based structure, . . . ), and the like utilized for sending assignment indications that allocate resource blocks within the respective groups. Further, an access terminal can have a common understanding of the group-specific signaling constraints; thus, a received assignment indication can be deciphered by the access terminal by utilizing the group-specific signaling constraints.

89 Claims, 19 Drawing Sheets

(56) References Cited

FOREIGN PATENT DOCUMENTS

| TW | 200814693 A | 3/2008 |
|---|---|---|
| WO | WO-9956475 A1 | 11/1999 |
| WO | 2004019645 A1 | 3/2004 |
| WO | WO2006114710 | 2/2006 |
| WO | WO-2006045099 A1 | 4/2006 |
| WO | WO2006099062 | 9/2006 |
| WO | WO2007023379 | 3/2007 |
| WO | WO 2007023379 A2 * | 3/2007 |
| WO | WO-2007051181 | 5/2007 |
| WO | WO-2008045980 A2 | 4/2008 |

OTHER PUBLICATIONS

Downlink resource allocation for E-UTRA 3rd Generation Partnership Project (3GPP); Technical Specification Group (TSG) Radio Access Network (RAN); Working Group 1 (WG1), vol. RI-051049, Oct. 10, 2005, pp. 1-4.

International Search Report and Written Opinion—PCT/US08/062559, International Search Authority—European Patent Office—Aug. 25, 2008.

TSG-RAN WG1#46BIS NEC Group, NTT DoCoMo: "RI-062773 Uplink Resource Allocation for E-UTRA" 3GPP, [Online] Oct. 13, 2006, pp. 1-10, XP002492075 Retrieved from the Internet: URL:http://www.quinti1lion.co.jp/3GPP/TSGRAN/TSG_RAN2006/TS6_RAN_WG1_RL1_10.html> [retrieved on Aug. 13, 2008] the whole document.

European Search Report, EP12163099—International Search Authority—Berlin—May 15, 2012.

Taiwan Search Report—TW097116375—TIPO—May 21, 2013.

LG Electronics: "Downlink/uplink scheduling assignment", 3GPP TSG-RAN WG1#48, 3GPP, Feb. 16, 2007, R1-070924, pp. 1-6.

* cited by examiner

FLEXIBLE SIGNALING OF RESOURCES ON A CONTROL CHANNEL

CROSS-REFERENCE TO RELATED APPLICATIONS

This application claims the benefit of U.S. Provisional Patent application Ser. No. 60/915,660 entitled "A METHOD AND APPARATUS FOR FLEXIBLE SIGNALLING OF RESOURCES ON THE CONTROL CHANNEL" which was filed May 2, 2007. The entirety of the aforementioned application is herein incorporated by reference.

BACKGROUND

I. Field

The following description relates generally to wireless communications, and more particularly to employing flexible signaling of resources on a control channel in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Base stations commonly schedule uplink and downlink transmissions. For instance, a base station can allocate one or more resource blocks to be utilized when transferring downlink transmissions to a particular access terminal. By way of further illustration, the base station can allot one or more resource blocks to be employed for sending uplink transmissions from a given access terminal to the base station. Moreover, the base station can use a signaling scheme to notify access terminals concerning such resource block assignments. However, conventional signaling schemes designed to indicate to a particular access terminal that one or more resource blocks associated with uplink or downlink channel(s) are allocated to that particular access terminal oftentimes use significant amounts of overhead and/or can be inflexible. According to an example, common signaling techniques can use a bitmap structure where a respective bit corresponds to each resource block that can be allocated by a base station to an access terminal; thus, each bit can indicate whether or not the corresponding resource block is allocated to a given access terminal. When used in a broadband communication environment that operates over large bandwidths (e.g., relatively wide range of frequencies, . . . ), the number of bits used to signal resource block allocations to access terminals can become very large. Hence, significant overhead usage can hamper overall system performance and/or cause such signaling techniques to be impractical or infeasible.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of flexible signaling of resource block assignments on a control channel. Resource blocks associated with an uplink or downlink channel can be split into a plurality of groups, and group-specific signaling constraints can be utilized with each of these groups. For example, the group-specific signaling constraints can relate to minimum resource block allocation units, signaling structures (e.g., bitmap structure, contiguous allocation structure, tree-based structure, . . . ), and the like utilized for sending assignment indications that allocate resource blocks within the respective groups. Further, an access terminal can have a common understanding of the group-specific signaling constraints; thus, a received assignment indication can be deciphered by the access terminal by utilizing the group-specific signaling constraints.

According to related aspects, a method that facilitates allocating resource blocks of a channel in a wireless communication environment is described herein. The method can include transmitting information related to group-specific signaling constraints for a plurality of groups of resource blocks via a downlink. Moreover, the method can comprise assigning resource blocks from one or more of the groups to an access terminal. Further, the method can include signaling the assigned resource blocks to the access terminal using the group-specific signaling constraints.

Another aspect relates to a wireless communications apparatus. The wireless communications apparatus can include a memory that retains instructions related to allocating resource blocks from one or more groups of resource blocks to an access terminal based at least in part upon group-specific signaling constraints, and transferring an indication of the resource block allocation to the access terminal using the group-specific signaling constraints. Further, the wireless communications apparatus can include a processor, coupled to the memory, configured to execute the instructions retained in the memory.

Yet another aspect relates to a wireless communications apparatus that enables utilizing a flexible scheme for signaling resource block assignments in a wireless communication environment. The wireless communications apparatus can include means for sending information pertaining to group-specific signaling constraints for a plurality of groups of resource blocks. Further, the wireless communications apparatus can include means for allotting resource blocks from at least one group to an access terminal. Moreover, the wireless communications apparatus can include means for sending an indication corresponding to the allotted resource blocks to the access terminal using the group-specific signaling constraints.

Still another aspect relates to a computer program product that can comprise a computer-readable medium. The computer-readable medium can include code for transferring information pertaining to group-specific signaling constraints for a plurality of groups of resource blocks. Further, the computer-readable medium can comprise code for allotting resource blocks from at least one group to an access terminal. Moreover, the computer-readable medium can include code for transmitting an indication corresponding to the allotted resource blocks to the access terminal using the group-specific signaling constraints.

In accordance with another aspect, an apparatus in a wireless communication system can include a processor, wherein the processor can be configured to allocate resource blocks from one or more groups of resource blocks to an access terminal based at least in part upon group-specific signaling constraints. Moreover, the processor can be configured to transfer an indication of the resource block allocation to the access terminal using the group-specific signaling constraints over a control channel.

According to other aspects, a method that facilitates obtaining resource block assignments in a wireless communication environment is described herein. The method can include receiving information related to group-specific signaling constraints for a plurality of groups of resource blocks from a base station. Further, the method can comprise receiving an assignment message transferred from the base station utilizing the group-specific signaling constraints. Moreover, the method can comprise determining allocated resource blocks by deciphering the assignment message based upon the group-specific signaling constraints.

Yet another aspect relates to a wireless communications apparatus that can include a memory that retains instructions related to obtaining an assignment message transferred from a base station utilizing group-specific signaling constraints via a control channel, and determining assigned resource blocks from one or more groups of resource blocks by analyzing the assignment message with the group-specific signaling constraints. Further, the wireless communications apparatus can comprise a processor, coupled to the memory, configured to execute the instructions retained in the memory.

Another aspect relates to a wireless communications apparatus that enables employing resource blocks assigned via a flexible signaling scheme in a wireless communication environment. The wireless communications apparatus can include means for obtaining information pertaining to group-specific signaling constraints for more than one group of resource blocks from a base station. Further, the wireless communications apparatus can comprise means for obtaining an indication of an assignment of one or more resource blocks from one or more of the groups, the indication being communicated using the group-specific signaling constraints. Moreover, the wireless communications apparatus can include means for evaluating the indication using the group-specific signaling constraints to recognize the assigned one or more resource blocks.

Still another aspect relates to a computer program product that can comprise a computer-readable medium. The computer-readable medium can include code for receiving information pertaining to group-specific signaling constraints for more than one group of resource blocks from a base station via a broadcast channel. The computer-readable medium can also include code for receiving an indication of an assignment of one or more resource blocks from one or more of the groups, the indication being communicated using the group-specific signaling constraints via a control channel. Further, the computer-readable medium can include code for evaluating the indication using the group-specific signaling constraints to recognize the assigned one or more resource blocks.

In accordance with another aspect, an apparatus in a wireless communication system can include a processor, wherein the processor can be configured to receive an assignment message transferred from a base station utilizing group-specific signaling constraints via a control channel; and determine assigned resource blocks from one or more groups of resource blocks by analyzing the assignment message with the group-specific signaling constraints.

According to related aspects, a method that facilitates assigning resource blocks of a channel in a wireless communication environment is described herein. The method can include generating a resource allocation assignment message that includes an explicit indication of one or more groups from which one or more resource blocks are allocated to an access terminal. Moreover, the method can include transmitting the resource allocation assignment message to the access terminal.

Another aspect relates to a wireless communications apparatus. The wireless communications apparatus can include a memory that retains instructions related to generating a resource allocation assignment message that includes an explicit indication of one or more groups from which one or more resource blocks are allocated to an access terminal and sending the resource allocation assignment message to the access terminal. Further, the wireless communications apparatus can include a processor, coupled to the memory, configured to execute the instructions retained in the memory.

Yet another aspect relates to a wireless communications apparatus that enables signaling resource block assignments in a wireless communication environment. The wireless communications apparatus can include means for yielding an assignment message that includes an explicit indication of one or more groups from which one or more resource blocks are allocated to an access terminal; and means for transferring the assignment message to the access terminal.

Still another aspect relates to a computer program product that can comprise a computer-readable medium. The computer-readable medium can include code for yielding an assignment message that includes an explicit indication of one or more groups from which one or more resource blocks are allocated to an access terminal. Further, the computer-readable medium can include code for transferring the assignment message to the access terminal.

In accordance with another aspect, an apparatus in a wireless communication system can include a processor, wherein the processor can be configured to generate a resource allocation assignment message that includes an explicit indication of one or more groups from which one or more resource blocks are allocated to an access terminal and/or transmit the resource allocation assignment message to the access terminal.

According to other aspects, a method that facilitates receiving resource block assignments in a wireless communication environment is described herein. The method can include receiving a resource allocation assignment message that includes an explicit indication of one or more groups from which one or more resource blocks are assigned. The method can also include determining the one or more assigned resource blocks by deciphering the resource allocation assignment message.

Yet another aspect relates to a wireless communications apparatus that can include a memory that retains instructions related to obtaining a resource allocation assignment message that includes an explicit indication of one or more groups from which one or more resource blocks are assigned and recognizing the one or more assigned resource blocks by deciphering the resource allocation assignment message. Further, the wireless communications apparatus can comprise a processor, coupled to the memory, configured to execute the instructions retained in the memory.

Another aspect relates to a wireless communications apparatus that enables employing allocated resource blocks in a wireless communication environment. The wireless communications apparatus can include means for obtaining an assignment message that includes an explicit indication of one or more groups from which one or more resource blocks are assigned. Moreover, the wireless communications apparatus can comprise means for evaluating the assignment message to identify the one or more assigned resource blocks.

Still another aspect relates to a computer program product that can comprise a computer-readable medium. The computer-readable medium can include code for obtaining an assignment message that includes an explicit indication of one or more groups from which one or more resource blocks are assigned. Further, the computer-readable medium can comprise code for evaluating the assignment message to identify the one or more assigned resource blocks.

In accordance with another aspect, an apparatus in a wireless communication system can include a processor, wherein the processor can be configured to receive a resource allocation assignment message that includes an explicit indication of one or more groups from which one or more resource blocks are assigned; and determine the one or more assigned resource blocks by deciphering the resource allocation assignment message.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
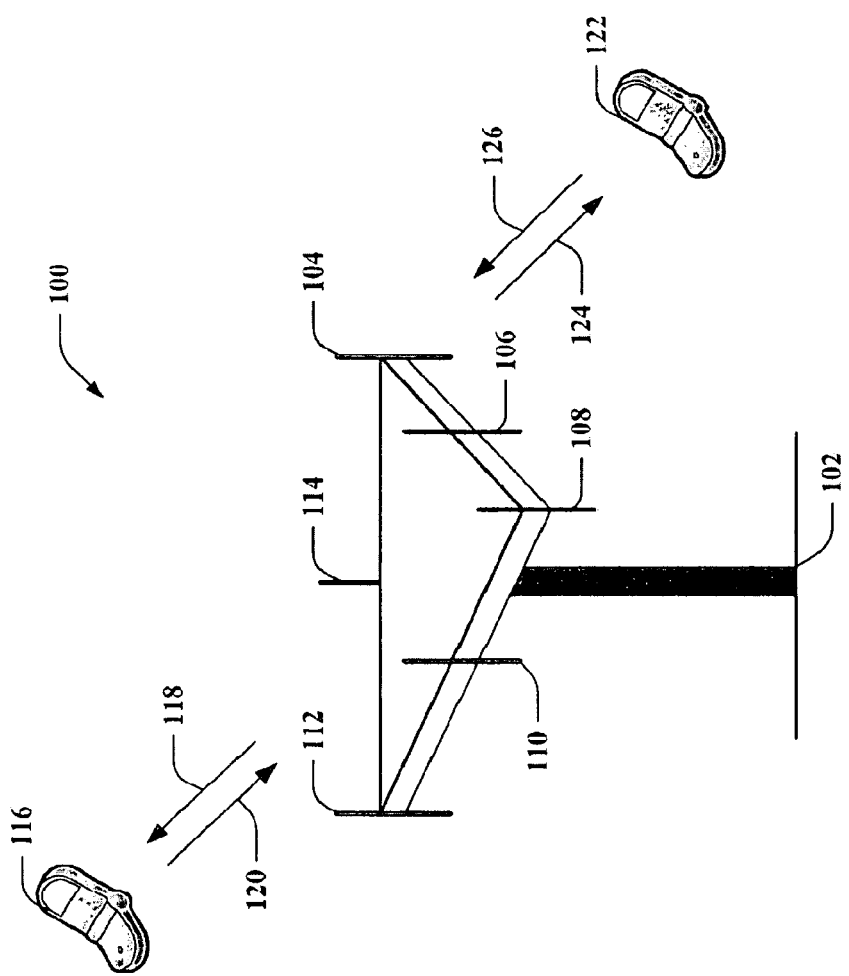
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 uses flexible signaling of resources (e.g., resource blocks) respectively allocated to access terminals 116 and 122. For instance, base station 102 can utilize this flexible signaling scheme on a downlink control channel, such as a Physical Downlink Control Channel (PDCCH), to indicate resource block allocation associated with downlink and/or uplink channels (e.g., Physical Downlink Shared Channel (PDSCH), Physical Uplink Shared Channel (PUSCH), . . . ). Accordingly, the flexible signaling scheme described herein can utilize reduced overhead while providing base station 102 (e.g., a scheduler associated with base station 102 that decides which resource block(s) to allot to which access terminal 116, 122, . . . ) with flexibility to enhance performance as compared to conventional signaling techniques. This flexible signaling scheme can be employed when system 100 operates over a large frequency band (e.g., associated with LTE, E-UTRA, and the like).

The flexible signaling scheme can be utilized when system 100 operates in a dynamic scheduling mode. The flexible signaling scheme used by system 100 can employ one or more groups of resource blocks. Further, each group can be associated with respective signaling constraints for the resource blocks that belong to that given group. Signaling constraints for different groups of resource blocks can be similar and/or differing. By way of example where two groups of resource blocks are utilized by system 100, a subset of the signaling constraints respectively related to each of the groups can be the same while a remainder of the signaling constraints respectively related to each of the groups can be different; however, it is also contemplated that all signaling constraints can differ or can be substantially similar for the two groups in such example.

Groupings of resource blocks as well as respective signaling constraints used for each of the groups of resource blocks can be known by both base station 102 and access terminals 116 and 122. By way of illustration, base station 102 can group the resource blocks and/or apply signaling constraints to one or more of the groups of resource blocks. Thus, following this illustration, base station 102 can disseminate information related to the groupings and/or applied signaling constraints to access terminals 116 and 122. For instance, such information can be sent over a broadcast channel (e.g., Broadcast Channel (BCH), . . . ). In accordance with another example, predetermined information such as resource block groups and/or signaling constraints associated with one or more of the resource block groups can be used by both base station 102 and access terminals 116 and 122; hence, transferring such predetermined information need not be effectuated by base station 102. Further, it is to be appreciated that the predetermined information can be retained in respective memories of base station 102 and access terminals 116 and 122. Moreover, it is contemplated that the predetermined information can be stored in memory of base station 102 and sent to one or more of access terminals 116 and 122 via the downlink. Additionally, for instance, resource block groups and/or signaling constraints can be determined by base station 102 and/or access terminals 116 and 122 based upon a preset function.

Upon resource block groups and signaling constraints being known by both base station 102 and access terminals 116 and 122, base station 102 can generate and/or signal resource block assignments on a per access terminal basis. Thus, for instance, an assignment for a given access terminal (e.g., access terminal 116, access terminal 122, . . . ) can specify group(s) and resource block(s) within the group(s) allocated to that given access terminal. Use of such a signaling scheme can reduce a number of bits used to notify access terminals 116 and 122 of resource block allocations while providing base station 102 with flexibility (e.g., since different groups can use differing signaling constraints, . . . ).

Figure 2:
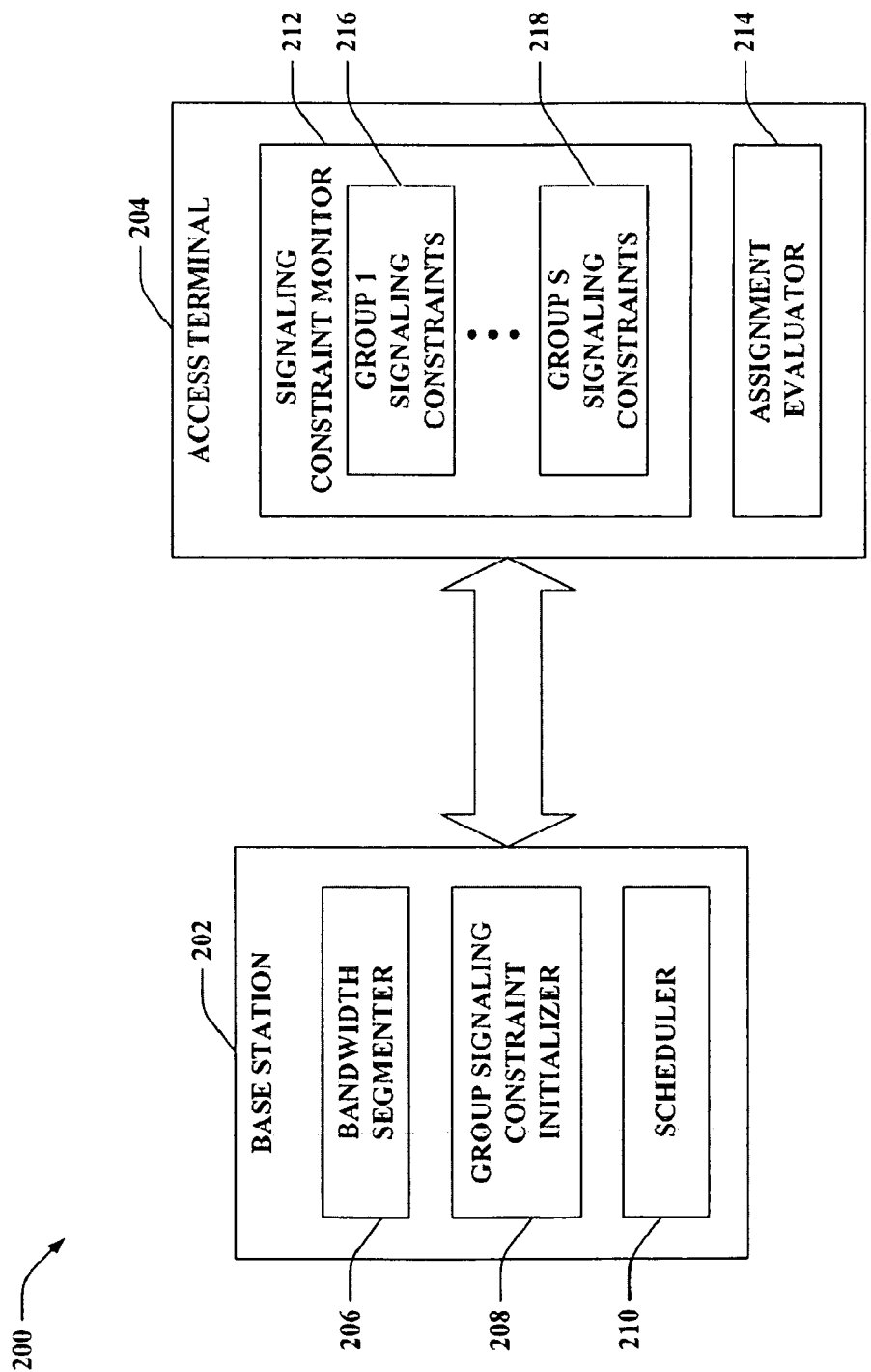
FIG. 2 is an illustration of an example system that employs flexible signaling of resource assignments in a wireless communication environment.

Now turning to FIG. 2, illustrated is a system 200 that employs flexible signaling of resource assignments in a wireless communication environment. System 200 can be an LTE based wireless communication system and/or an E-UTRA based wireless communication system. Additionally or alternatively, system 200 can leverage an OFDM-based structure to enable communicating via an uplink and a downlink. System 200 includes a base station 202 and an access terminal 204; however, although not shown, it is to be appreciated that system 200 can include any number of base stations, each of which can be similar to base station 202, and/or any number of access terminals, each of which can be similar to access terminal 204. Base station 202 can transfer information, signals, data, instructions, commands, bits, symbols, and the like to access terminal 204 via a downlink. Further, access terminal 204 can send information, signals, data, instructions, commands, bits, symbols, and so forth to base station 202 via an uplink.

Base station 202 can include a bandwidth segmenter 206 that divides a total frequency bandwidth into one or more subbands (e.g., S subbands, where S can be substantially any integer, S groups, . . . ). The total frequency bandwidth operated upon by bandwidth segmenter 206 can include R resource blocks, where R can be substantially any integer. The total number of resource blocks can have a large dynamic range (e.g., in E-UTRA, . . . ). For instance, the nominal range for the number of resource blocks can be from 6 to 100, which can correspond to 1.25 MHz and 20 MHz, respectively. According to another illustration, the range for the number of resource blocks can be from 6 to 170. It is to be appreciated, however, that the claimed subject matter is not limited to the aforementioned ranges.

Each resource block is a time/frequency resource. Moreover, it is contemplated that the term resource block utilized herein can refer to a virtual resource block (VRB), a physical resource block (PRB), and so forth. For instance, a virtual resource block allocation can be signaled by base station 202 to access terminal 204 (e.g., via PDCCH, . . . ), with a virtual resource block-to-physical resource block mapping being provided elsewhere (e.g., S-BCH, . . . ). Thus, a first virtual resource block does not necessarily correspond to a first location (e.g., first physical resource block) in the frequency bandwidth used by system 200.

Bandwidth segmenter 206 splits the total number of resource blocks into one or more groups. By way of example, bandwidth segmenter 206 can divide the total number of resource blocks into two or more groups, each of which can include an equal number of resource blocks. Following this example, the R resource blocks can be separated by bandwidth segmenter 206 into S groups, each with an equal number of resource blocks, and hence, each of the S groups can include R/S resource blocks. According to another illustration, bandwidth segmenter 206 can yield groups that include differing numbers of resource blocks. By way of a further example, bandwidth segmenter 206 can generate two or more groups that include the same number of resource blocks and at least one disparate group that includes a different number of resource blocks as compared to the two or more groups with the same number of resource blocks. Further, frequencies associated with each group yielded by bandwidth segmenter 206 are non-overlapping; thus, a given resource block is included in one group when two or more groups of resource blocks are generated by bandwidth segmenter 206. Further, groups yielded by bandwidth segmenter 206 allow for subband scheduling, frequency selective scheduling, and so forth. Moreover, subbands resulting from use of bandwidth segmenter 206 can lack relation to Channel Quality Indicator (CQI) reporting granularity.

Base station 202 can further include a group signaling constraint initializer 208 that can select group-specific signaling constraints for indicating allocation of resource blocks in each group yielded by bandwidth segmenter 206. Additionally or alternatively, group signaling constraint initializer 208 can transmit information related to the group-specific signaling constraints to access terminal 204. According to an illustration, group signaling constraint initializer 208 can determine and/or transfer information via the downlink pertaining to a first set of signaling constraints to be used in conjunction with a first group of resource blocks, a second set of signaling constraints to be utilized in connection with a second group of resource blocks, and so forth. Moreover, for instance, one or more signaling constraint utilized with the first group can be the same as one or more signaling constraint used with the second group. Additionally or alternatively, one or more signaling constraint used with the first group can differ from one or more signaling constraint employed with the second group.

Any type of group-specific signaling constraint can be yielded by group signaling constraint initializer 208. For instance, a signaling constraint controlled by group signaling constraint initializer 208 can relate to a minimum resource block allocation unit to be utilized in a given group (e.g., the minimum allocation unit can be M resource block(s), where M can be substantially any integer, . . . ); thus, differences in minimum resource block allocation units can yield differing granularities for disparate groups of resource blocks, which can enable scheduling based upon demand of applications (e.g., voice, video, messaging, . . . ). By way of further illustration, a signaling constraint implemented by group signaling constraint initializer 208 can be a signaling structure utilized for a particular group. According to an example, the signaling structure for a group can be a bitmap structure, a contiguous allocation structure (e.g., starting point and number of resource blocks, starting point and ending point, . . . ), a tree-based structure (e.g., binary tree, non-binary tree such as a union of trees, . . . ), and so forth. It is to be appreciated, however, that the claimed subject matter is not limited to the aforementioned examples of signaling constraints that can be allocated by group signaling constraint initializer 208 on a per-group basis.

Moreover, base station 202 can include a scheduler 210 that assigns resource block(s) in one or more groups to be used by access terminal 204 (and/or any disparate access terminal(s) (not shown)). Scheduler 210 can signal such assignment to access terminal 204 by employing the signaling constraints associated with each group as set forth by group signaling constraint initializer 208. By way of illustration where two groups of resource blocks are used, scheduler 210 can allocate resource block(s) from the first group and/or resource block(s) from the second group to be employed by access terminal 204. Further, scheduler 210 can utilize signaling constraints associated with the first group to signal the allocation of resource block(s) from the first group and/or signaling constraints associated with the second group to signal the allocation of resource block(s) from the second group. However, the claimed subject matter is not limited to the aforementioned illustration.

Access terminal 204 can further include a signaling constraint monitor 212 and an assignment evaluator 214. Signaling constraint monitor 212 (and/or access terminal 204) can obtain information related to number of resource block groups yielded by bandwidth segmenter 206. Further, signaling constraint monitor 212 can receive information pertaining to signaling constraints to be used in conjunction with each of the groups of resource blocks. Thus, signaling constraint monitor 212 can obtain information related to signaling constraints of S groups (e.g., group 1 signaling constraints 216, . . . , group S signaling constraints 218) sent by group signaling constraint initializer 208 of base station 202. For instance, signaling constraint monitor 212 can receive such signaling constraint related information via a broadcast channel (e.g., dynamic Broadcast Channel (BCH), . . . ).

Moreover, group-specific signaling constraints 216-218 determined by signaling constraint monitor 212 can be leveraged by assignment evaluator 214 to decipher received assignment messages (e.g., resource allocation assignment messages, . . . ) as sent by base station 202 (e.g., via scheduler 210, . . . ). For instance, assignment evaluator 214 can evaluate a common assignment message that allocates resource block(s) in one or more groups to access terminal 204. Moreover, based upon such evaluation, access terminal 204 can receive data via the downlink (e.g., sent over PDSCH, . . . ) and/or transmit data via the uplink (e.g., over PUSCH, . . . ).

According to an example, the resource block indication (e.g., assignment message, resource allocation assignment message, . . . ) can be sent by base station 202 (e.g., by scheduler 210, . . . ) on PDCCH. Further, the resource block indication can be system bandwidth dependent (e.g., for low bandwidths a bitmap structure and a minimum allocation of one resource block can be used, for large bandwidths a minimum allocation of two resource blocks and other signaling constraints to reduce signaling overhead can be leveraged, . . . ). The signaling constraints (e.g., scheduling restrictions, . . . ) can be group based as determined by group signaling constraint initializer 208, where a group refers to a set of resource blocks (e.g., as yielded by bandwidth segmenter 206, . . . ). Therefore, access terminal 204 and/or any disparate access terminal(s) can potentially be allocated resources on multiple groups with possibly some restrictions on each group. The restrictions on different groups can be different and/or the same. Examples of restrictions in each group can be use of a tree-based structure, a contiguous virtual resource structure, a bitmap structure, and so forth. Support of contiguous (physical) resources can be adequate for uplink grants and can also be supported for downlink assignments. Downlink assignments can be more flexible than just contiguous resources. For instance, group based restrictions stated above with the possibility of having contiguous, bitmap, or tree-based structures on each groups can be used. Moreover, the value of M (e.g., the number of resource blocks in a minimum allocation) can be signaled over a dynamic BCH.

Figure 3:
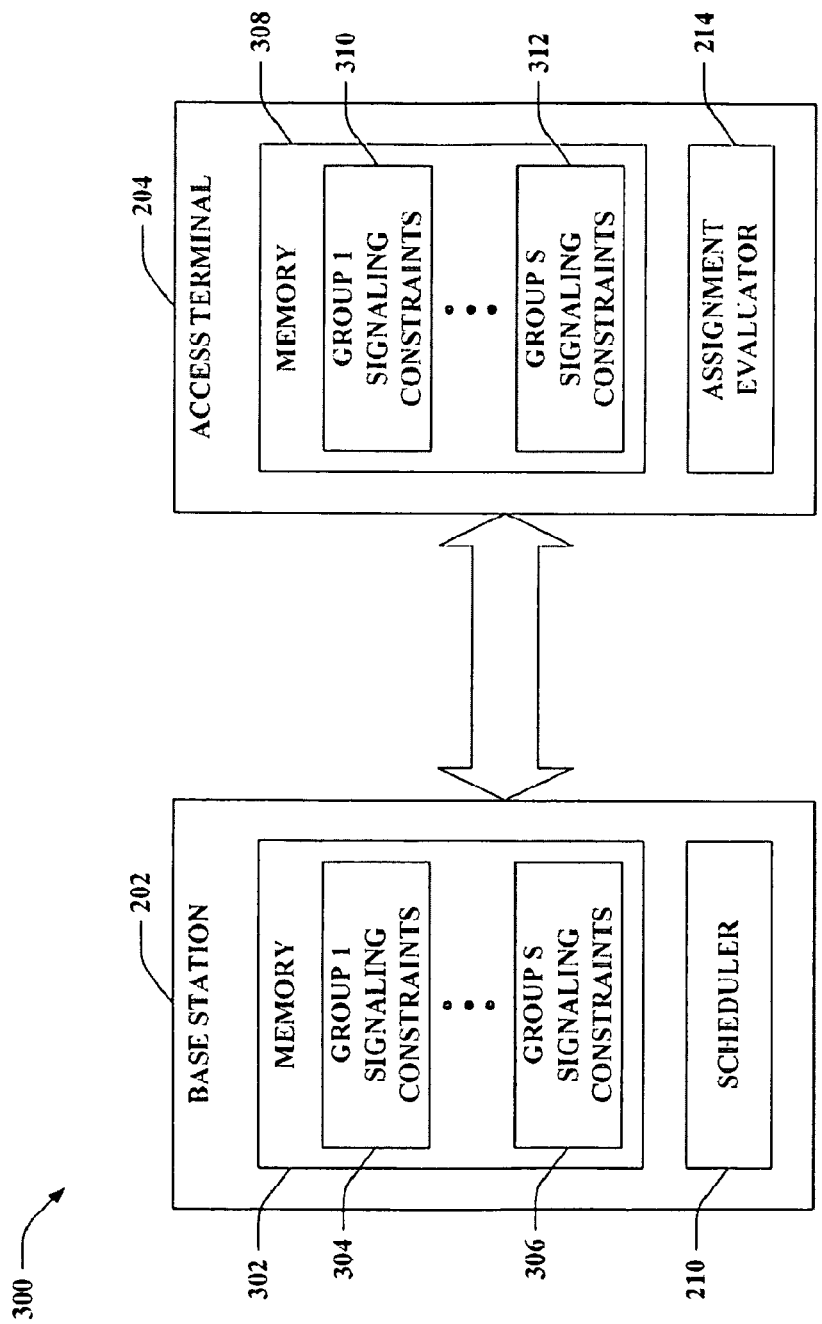
FIG. 3 is an illustration of an example system that employs flexible signaling by leveraging stored group-specific signaling constraints in a wireless communication environment.

Now referring to FIG. 3, illustrated is a system 300 that employs flexible signaling by leveraging stored group-specific signaling constraints in a wireless communication environment. System 300 includes base station 202 and access terminal 204. Moreover, although not shown, system 300 can include any number of disparate base stations similar to base station 202 and/or any number of disparate access terminals similar to access terminal 204. Further, as described above, base station 202 can include scheduler 210 and access terminal 204 can include assignment evaluator 214.

Moreover, base station 202 can comprise memory 302 that can retain signaling constraints pertaining to S groups of resource blocks. Thus, memory 302 can include group 1 signaling constraints 304, . . . , group S signaling constraints 306. Group-specific signaling constraints 304-306 can be employed by scheduler 210 when generating, transferring, etc. assignment messages. For instance, when scheduler 210 allocates resource block(s) in group 1 to access terminal 204, group 1 signaling constraints 304 (e.g., particular signaling structure, particular minimum resource block allocation unit, . . . ) can be utilized to communicate such allocation.

Further, access terminal 204 can also include memory 308 that can retain signaling constraints related to the S groups of resource blocks utilized by base station 202. Memory 308 can include group 1 signaling constraints 310, . . . , group S signaling constraints 312. Assignment evaluator 214 can utilize group-specific signaling constraints 310-312 retained in memory 308 to decipher received assignment messages obtained from base station 202. Thereafter, access terminal 204 can utilize allocated resource block(s) indicated in the received assignment messages to send and/or receive data.

It is to be appreciated that signaling constraints 304-306 stored in memory 302 of base station 202 can be substantially similar to signaling constraints 310-312 retained in memory 308 of access terminal 204. Moreover, memory 308 of access terminal 204 can additionally include disparate group-specific signaling constraints utilized by disparate base station(s) (not shown). These disparate group-specific signaling constraints can be used if access terminal 204 obtains an assignment message from such disparate base station(s).

According to an illustration, group-specific signaling constraints 304-306 can be stored in memory 302 of base station 202. Further, base station 202 can communicate information associated with group-specific signaling constraints 304-306 to access terminal 204, and access terminal 204 can retain this obtained information in memory 308 as group-specific signaling constraints 310-312. For instance, such information can be sent by group signaling constraint initializer 208 of FIG. 2; however, the claimed subject matter is not so limited. In accordance with another example, group-specific signaling constraints 304-306 can be transferred to access terminal 204 at most any time (e.g., upon access terminal 204 moving within proximity of base station 202, upon communication between base station 202 and access terminal 204 initiating, upon base station 202 generating and/or modifying one or more of group-specific signaling constraints 304-306, . . . ). Further, for instance, when access terminal 204 exits geographic proximity of base station 202 and experiences discontinued communication therewith, memory 308 can continue to retain group-specific signaling constraints 310-312 associated with base station 202 (although disparate group-specific signaling constraints can be utilized to analyze received assignment messages obtained from a disparate base station).

Pursuant to another example (not shown), memory 302 and/or memory 308 can include instructions that enable generating respective group-specific signaling constraints 304-306 and 310-312. For instance, the instructions can be leveraged (e.g., by processor(s) associated with base station 202 and/or access terminal 204) to yield group-specific signaling constraints as a function of a number of access terminals (including access terminal 204) with which base station 202 communicates, types of application(s) being effectuated (e.g., voice, streaming video, text messaging, emailing, web browsing, . . . ), time, available bandwidth, traffic, Quality of Service (QoS), total number of bits to be used to communicate resource block assignments, and so forth; however, it is to be appreciated that the claimed subject matter is not limited to the aforementioned examples. By way illustration, memory 302 of base station 202 can include the foregoing instructions, and hence, group-specific signaling constraints 304-306 can be derived therefrom. Moreover, base station 202 can thereafter transfer information related to group-specific signaling constraints 304-306 to access terminal 204, which can retain such information in memory 308. Alternatively, both base station 202 and access terminal 204 can determine group-specific signaling constraints based upon the aforementioned instructions that can be stored in respective memories 302 and 308.

Figure 4:
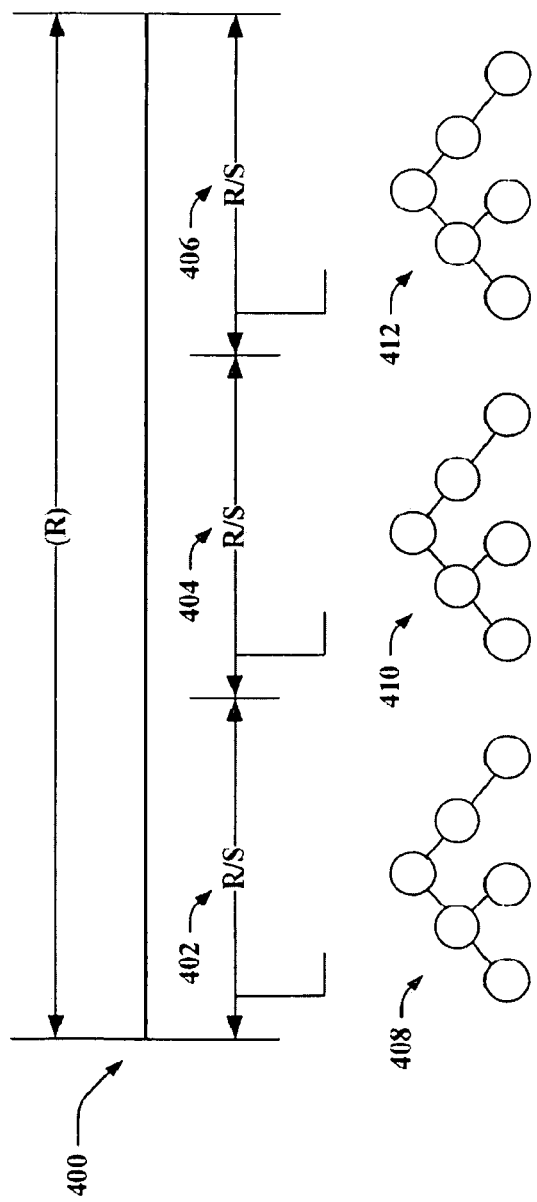
FIG. 4 is an illustration of an example frequency band that is split into subbands in accordance with various aspects of the subject disclosure.

Now referring to FIG. 4, illustrated is an example frequency band 400 that is split into subbands in accordance with various aspects. Frequency band 400 can be split into S subbands; as shown, S is equal to three (e.g., subband 402, subband 404, and subband 406), yet each base station can utilize substantially any S value. Further, frequency band 400 includes R resource blocks. As illustrated, subbands 402-406 each include an equal number of resource blocks (e.g., R/S), yet it is contemplated that differing sized subbands can be used.

According to an illustration, the S value can be signaled by a base station (e.g., transmitted to access terminal(s) that the base station serves). Additionally or alternatively, the base station can provide this information for each assignment. In an aspect, the S value can be provided once, and can be maintained by the access terminal as long as the access terminal uses that base station for communication. The base station can also provide a starting point for each subband 402-406. The starting point can be different for each subband and each base station in a network can use different S values. Further, the S value can be modified dynamically.

Moreover, as shown, each subband 402-406 can use a respective tree-based structure (e.g., tree-based structure 408, tree-based structure 410, and tree-based structure 412) for signaling resource block assignments. Thus, each subband 402-406 can be provided in a respective sub-tree format. In another aspect, S value(s) of neighboring base station(s) can be received and maintained by an access terminal.

Referring to FIGS. 5-8, illustrated are example flexible signaling schemes in accordance with various aspects of the subject disclosure. For purposes of simplicity of explanation, each of the examples depicts a frequency band that includes 24 resource blocks; however, it is contemplated that any number of resource blocks can be included in a frequency band utilized in connection with the claimed subject matter. Further, the examples illustrate various groupings of these 24 resource blocks and signaling constraints that can be utilized for each of these groupings. It is to be appreciated that FIGS. 5-8 are provided for illustrative purposes and the disclosed subject matter is not limited to the scope of these examples. Those skilled in the art should appreciate how these examples can be extended to systems including differing frequency bands, groupings of resource blocks in such frequency bands, signaling constraints (e.g., minimum allocation units, signaling structures, . . . ), allocation unit assignments, and the like.

Figure 5:
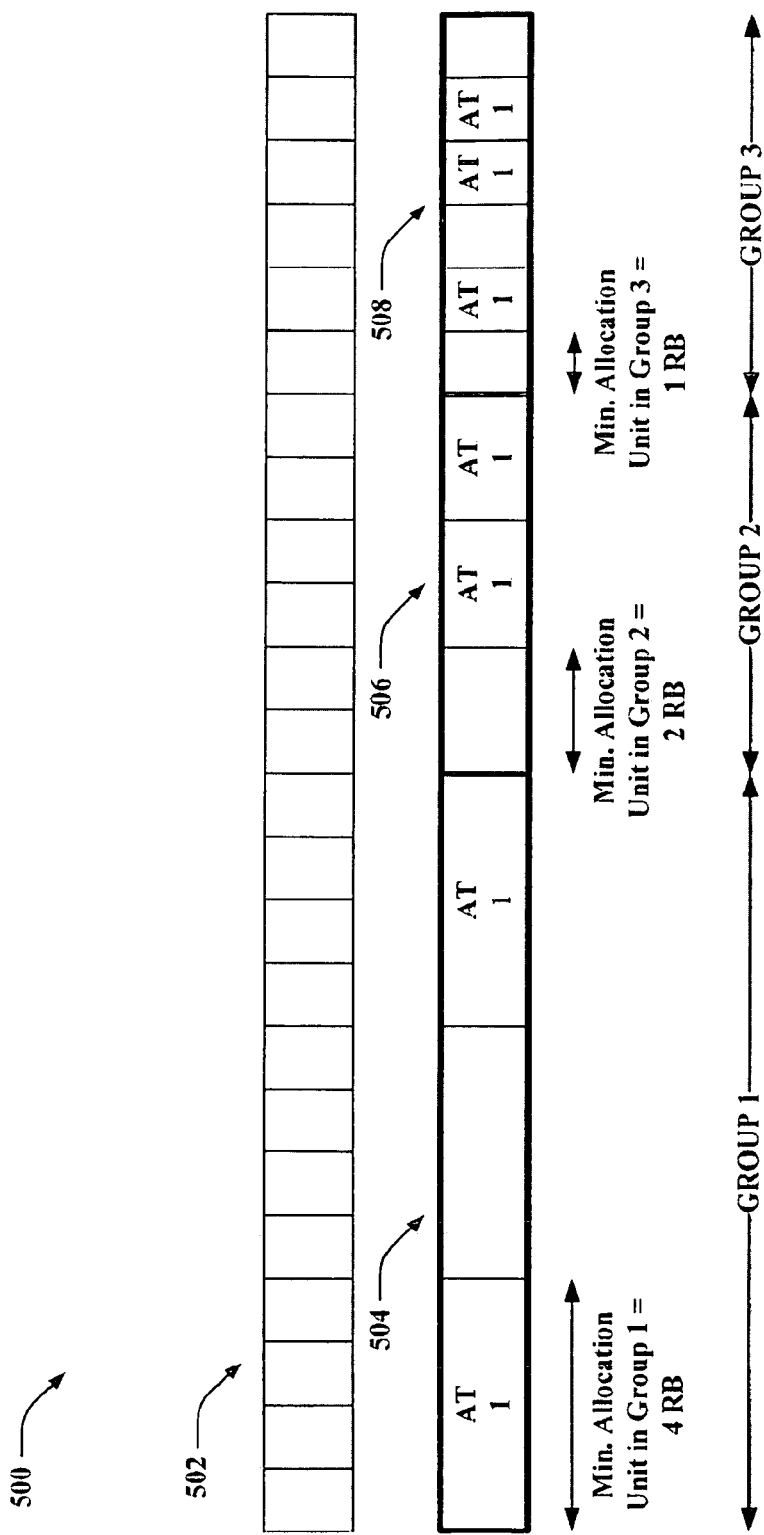
FIGS. 5-8 illustrate example flexible signaling schemes in accordance with various aspects of the subject disclosure.

Now turning to FIG. 5, illustrated is an example flexible signaling scheme 500 applied to a frequency band 502 that includes 24 resource blocks. The 24 resource blocks of frequency band 502 are split into three groups: group 1 504 which includes 12 resource blocks, group 2 506 which includes 6 resource blocks, and group 3 508 which includes 6 resource blocks. Each group 504-508 is allocated respective signaling constraints. More particularly, a signaling structure and a minimum resource block allocation unit can be allotted to each group 504-508. As shown, groups 504-508 each employ a bitmap signaling structure; thus, whether or not each allocation unit is allocated to an access terminal can be indicated via respective bits that can be transferred (e.g., each allocation unit in groups 504-508 is associated with a corresponding bit, . . . ). Further, each group 504-508 has a different granularity which can allow for differential scheduling based upon application demands (e.g., voice applications can be allocated fewer resource blocks compared to streaming video applications, . . . ). As depicted, a minimum allocation unit in group 1 504 is four resource blocks, a minimum allocation unit in group 2 506 is two resource blocks, and a minimum allocation unit in group 3 508 is one resource block.

Further, resource blocks from frequency band 502 can be assigned to one or more access terminals in accordance with the signaling constraints. As shown, a subset of the resource blocks can be allocated to an access terminal 1 (AT 1). Due to the flexible nature of the bitmap signaling structure, various resource block(s) from one or more groups can be assigned to AT 1. Thus, two allocation units from group 1 504 (e.g., each corresponding to four resource blocks), two allocation units from group 2 506 (e.g., each corresponding to two resource blocks), and three allocation units from group 3 508 (e.g., each corresponding to one resource block) can be allotted to AT 1. Further, such allotment can be signaled to AT 1. Since bitmap structures are used in example scheme 500, one or more allocation units can be assigned to AT 1 (or any disparate access terminal) from any location within any group (e.g., a first allocation unit in a particular group assigned to a given access terminal can be adjacent and/or non-adjacent to a second allocation unit within that particular group, . . . ).

In a conventional bitmap approach (e.g., lacking multiple groups of resource blocks with group-specific signaling constraints, . . . ), a number of bits used to indicate resource block allocation can equal a number of resource blocks; thus, according to an illustration where 24 resource blocks are used for a conventional bitmap scheme, 24 bits can be used to signal assignments. Hence, a number of bits used to signal resource block assignments directly correlates to bandwidth increases (e.g., conventional bitmap schemes can use 6 bits to indicate resource block allocation for a bandwidth of 1.08 MHz, 25 bits for a bandwidth of 4.5 MHz, 50 bits for 9 MHz, 100 bits for 18 MHz, 170 bits for 25.5 MHz, . . . ).

A bitmap signaling structure can provide flexibility to a scheduler. For example, flexibility can be provided for downlink scheduling, which uses an OFDM waveform, yet may be lacking for uplink scheduling, which can use a localized single carrier waveform, in an LTE environment. According to another illustration, flexibility can be provided for both uplink and downlink scheduling where OFDM waveforms are used for both the uplink and downlink. However, a total number of bits allowed in the PDCCH can be fairly small (e.g., less than 50 bits, . . . ), since this channel can be designed for stringent coverage requirements. Hence, while conventional bitmap techniques can be flexible, the associated PDCCH overhead can be unacceptable for large bandwidths.

The following describes additional aspects of common bitmap approaches; however, it is to be appreciated that that claimed subject matter is not limited to the below examples and illustrations. For large bandwidth operation, the bitmap approach can be modified by changing the minimum allocation unit. Such an approach can reduce overhead associated with the bitmap signaling scheme. For instance, the minimum allocation can be changed from 12 tones to M*12 tones. Such an approach can reduce overhead associated with the bitmap approach by a factor of M. However, as M increases, padding overhead increases for small packets. Further, use of 12 tones for a minimum allocation unit can be based on short packets for real time (RT) services such as Voice over Internet Protocol (VoIP), etc. From this viewpoint, changing the minimum allocation to M*12 tones can have a direct impact on VoIP capacity and system performance with a mix of best-effort (BE) and real-time traffic. According to another illustration, for large bandwidth operation, the bitmap approach can be modified with a variable minimum allocation, with RT users be allocated in increments of one resource block and BE users be allocated in increments of M resource blocks. Thus, it can be assumed that the number of resource blocks allocated to RT users is equal to Nr and the number of resource blocks allocated to BE users is equal to Nb=N−Nr. The total number of bits used on PDCCH can hence equal Nr+ceil(Nb/M)=Nr*(1−(1/M))+(N/M). Following the aforementioned example, when 25 resource blocks in total are allocated to users, including 6 resource blocks allocated to RT users, 11 bits can be used for signaling on PDCCH when M=4 and 10 bits can be used for signaling when M=6. Further, when 50 resource blocks in total are allotted to users, including 12 resource blocks allocated to RT users, 22 bits can be used for signaling on PDCCH when M=4 and 19 bits can be used for signaling when M=6. Moreover, when 100 resource blocks in total are allocated to users, including 25 resource blocks allocated to RT users, 44 bits are used for signaling on PDCCH when M=4 and 38 bits are used for signaling when M=6. Hence, for large bandwidth, the number of bits can be fairly substantial; thus, such an approach can fail to provide acceptable overhead. Further, VoIP capacity can be directly impacted due to restriction of using at most Nr resource blocks and padding overhead if some of the Nb resource blocks are used. Accordingly, scheme 500 can address one or more of the aforementioned deficiencies of conventional techniques.

Figure 6:
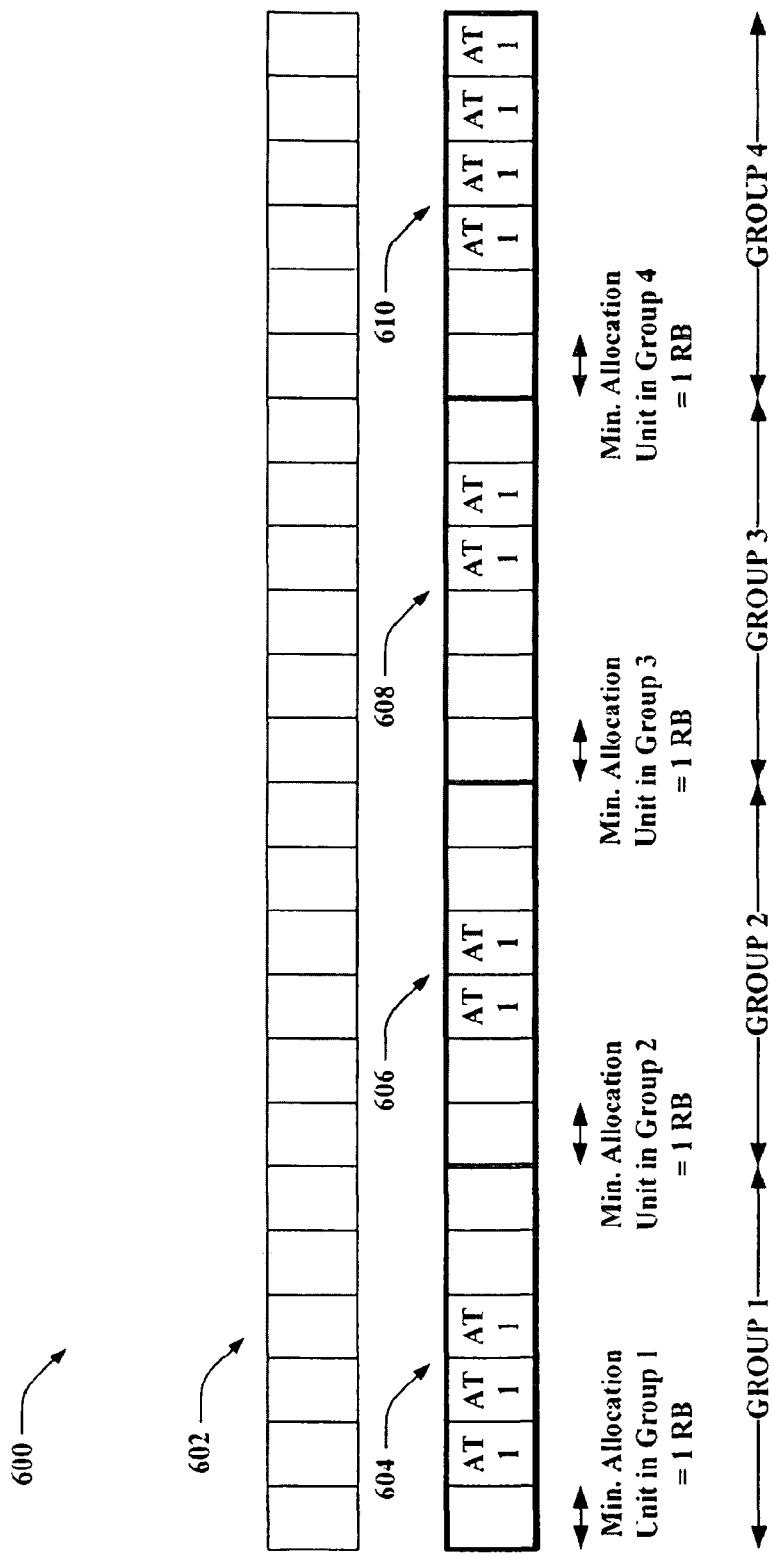

Referring to FIG. 6, illustrated is another example flexible signaling scheme 600 utilized with a frequency band 602 that includes 24 resource blocks. Resource blocks of frequency band 602 are separated into four groups (e.g., group 1 604, group 2 606, group 3 608, and group 4 610), each of which include 6 resource blocks. Signaling constraints of each group 604-610 can be substantially similar; namely, a minimum resource block allocation unit can be one resource block for each group 604-610. Further, a contiguous allocation structure can be used per group 604-610, where allocation within each group 604-610 for an access terminal can be a contiguous number of resource blocks. Thus, three contiguous allocation units can be assigned to AT 1 from group 1 604, two contiguous allocation units can be assigned to AT 1 from group 2 606, two contiguous allocation units can be assigned to AT 1 from group 3 608, and four contiguous allocation units can be assigned to AT 1 from group 4 610.

Contiguous allocation signaling of a resource block allocation can be carried out by indicating a starting point and a number of resource blocks. For example, for a frequency band with one group (rather than the four groups 604-610 as depicted), the total number of bits needed for signaling can equal ceil(log 2(N*(N+1)/2)). Thus, following this example, 5 bits can be used to indicate resource block allocation for a bandwidth of 1.08 MHz when noting a starting point and a number of resource blocks assigned, 9 bits can be used for a bandwidth of 4.5 MHz, 11 bits can be utilized for a bandwidth of 9 MHz, 13 bits can be employed for a bandwidth of 18 MHz, 14 bits can be used for a bandwidth of 25.5 MHz, and so forth. Thus, as bandwidth increases, significant reduction in the number of bits used for resource block allocation can result by using the starting point and number of resource block approach as compared to using the conventional bitmap approach described above.

In contrast to the aforementioned example describing use of one group within a frequency band, flexible signaling scheme 600 uses contiguous allocation per subband (e.g., per group) for a plurality of subbands (e.g., plurality of groups). Thus, in this structure, the starting point and number of resource blocks are both signaled per subband. Moreover, the number of bits ($N_b$) used can be determined as follows:

$$x = \frac{R}{S \cdot M}$$

$$N_b - \text{ceil}\left(\log_2\left(\left[\frac{x \cdot (x+1)}{2}\right]^s - 1\right)\right)$$

By way of illustration, a minimum allocation unit (M) of one resource block can be used. Accordingly, where five subbands (S) are employed, 20 bits can be used to signal resource block assignments for a bandwidth of 4.5 MHz, 30 bits can be used to signal assignments for a bandwidth of 9 MHz, 40 bits can be utilized to signal assignments for a bandwidth of 18 MHz, and so forth. Moreover, changing the minimum allocation unit to two resource blocks while maintaining the five subbands can result in using 20 bits for signaling resource block assignments for a bandwidth of 9 MHz, 30 bits for signaling resource block assignments for a bandwidth of 18 MHz, and the like.

Figure 7:
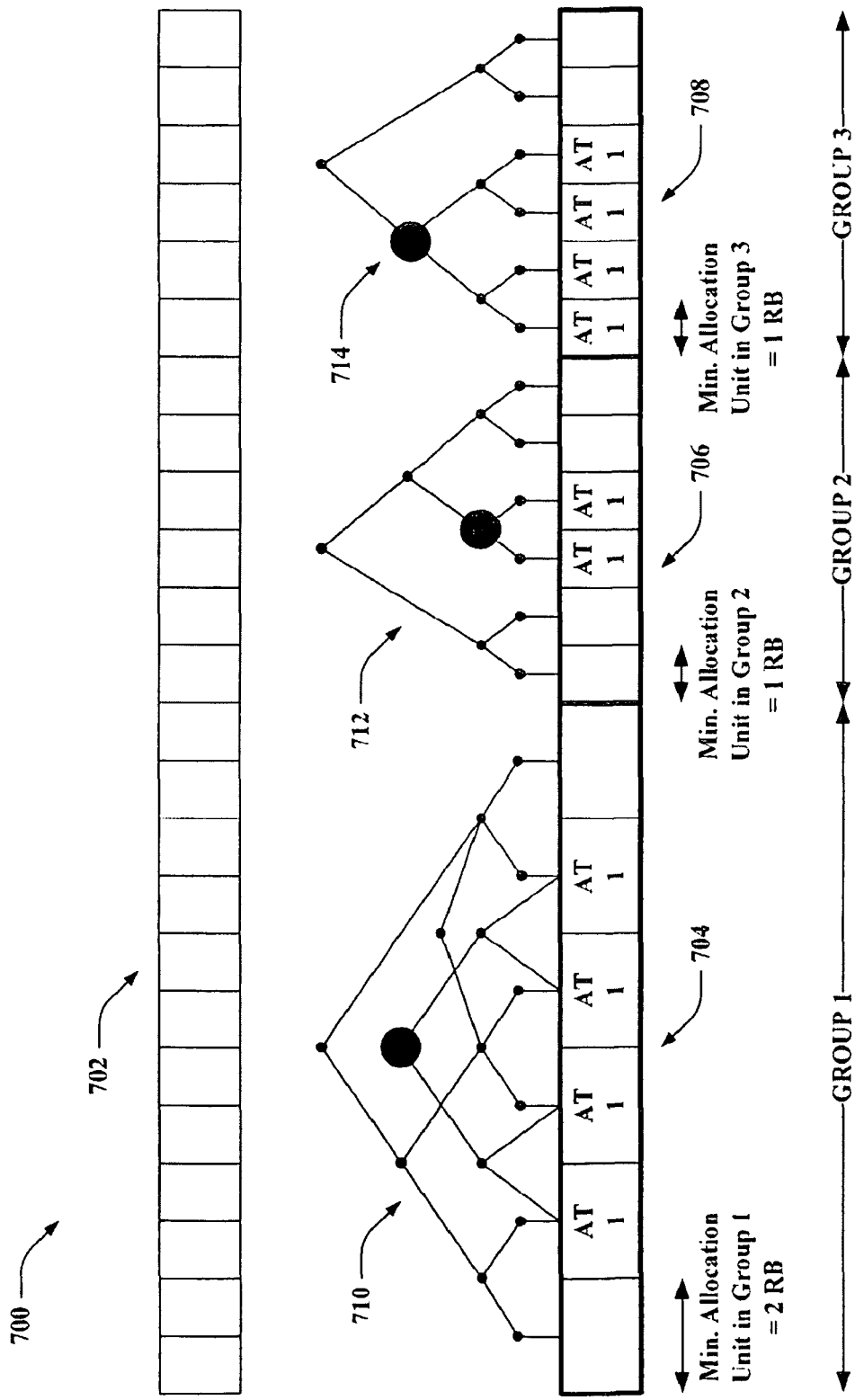

With reference to FIG. 7, illustrated is another example flexible signaling scheme 700 employed with a frequency band 702 that includes 24 resource blocks. The resource blocks of frequency band 702 are separated into three groups (e.g., group 1 704, group 2 706, and group 3 708). Group 1 704 includes 12 resource blocks, group 2 706 includes 6 resource blocks, and group 3 708 includes 6 resource blocks. Further, the minimum allocation unit in group 1 704 is two resource blocks, while the minimum allocation unit is one resource block in both group 2 706 and group 3 708. Further, a tree-based structure per group is utilized in flexible signaling scheme 700. Thus, tree-based structure 710 can be used for group 1 704, tree-based structure 712 can be employed for group 2 706, and tree-based structure 714 can be utilized for group 3 708. Moreover, a particular node within one or more of the tree-based structures 710-714 can be selected for AT 1, and hence, corresponding allocation units can be assigned to AT 1. Accordingly, the illustrated node selections yield four allocation units from group 1 704, two allocation units from group 2 706, and four allocation units from group 3 708 to be allotted to AT 1.

Signaling scheme 700 relates to an example of a tree-based allocation per subband where resource block tree nodes are signaled per subband. According to an illustration where an equal number of resource blocks are included in each subband (rather than the differing sized groups 704-708 depicted), the number of bits used for signaling can be determined as follows:

$$x = \frac{R}{S \cdot M}$$

$$N_b - \text{ceil}(\log_2((2 \cdot x)^s) - 1)$$

By way of illustration, a minimum allocation unit (M) of one resource block can be used. Accordingly, where five subbands (S) are employed and a respective binary-tree is used in conjunction with each of the five subbands (e.g., as opposed to M-ary trees, union of trees, . . . ), 17 bits can be used to signal resource block assignments for a bandwidth of 4.5 MHz, 22 bits can be used to signal assignments for a bandwidth of 9 MHz, 27 bits can be utilized to signal assignments for a bandwidth of 18 MHz, and so forth. Moreover, altering the minimum allocation unit to two resource blocks while maintaining the five subbands, each associated with a respective binary-tree, can result in using 17 bits for signaling resource block assignments for a bandwidth of 9 MHz, 22 bits for signaling resource block assignments for a bandwidth of 18 MHz, and the like. For instance, the tree-based signaling structure used for multiple groups of resource blocks can enable reducing PDCCH overhead, while still retaining the ability to signal non-contiguous resource blocks. It is to be appreciated that any type of tree-based structures (e.g., binary, non-binary, . . . ) can be utilized so long as a base station and access terminal have common understanding of the structures.

Figure 8:
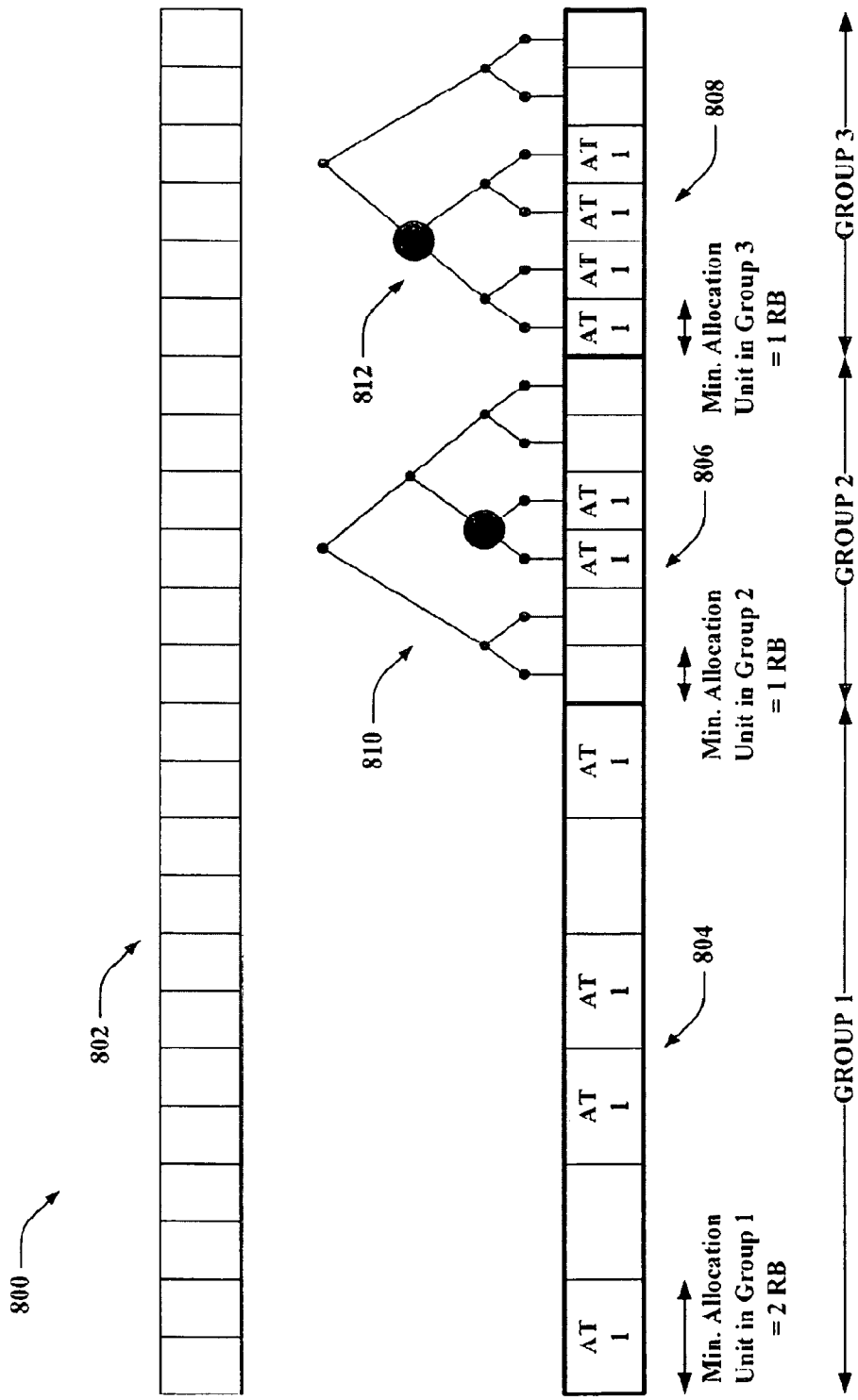

Now referring to FIG. 8, illustrated is a further example flexible signaling scheme 800 utilized with a frequency band 802. Frequency band 802 includes 24 resource blocks that are separated into three groups (e.g., group 1 804, group 2 806, and group 3 808). Group 1 804 includes 12 resource blocks, group 2 806 includes 6 resource blocks, and group 3 808 includes 6 resource blocks. Further, a minimum allocation unit within group 1 804 is two resource blocks, while a minimum allocation unit of one resource block is used for group 2 806 and group 3 808. Moreover, a mixture of signaling structures are depicted; namely, a bitmap signaling structure is used for group 1 804, a first tree-based signaling structure 810 is used for group 2 806, and a second tree-based signaling structure 812 is used for group 3 808. Thus, as illustrated, four allocation units can be assigned to AT 1 in a bitmapping manner from group 1 804, two allocation units from group 2 806 can be assigned to AT 1 based upon a node selection from first tree-based signaling structure 810, and four allocation units from group 3 808 can be assigned to AT 1 based upon a node selection from second tree-based signaling structure 812.

According to an example, resource block signaling for downlink assignments can use a tree-based signaling structure, while resource block signaling for uplink assignments can utilize a contiguous allocation signaling structure. For downlink assignments, values of (S,M) can be indicated in S-BCH. Further, resource block tree nodes can be indicated in PDCCH. Further, for uplink assignments, S can be equal to 1 in an LTE based environment (e.g., due to the single waveform utilized for the uplink). Moreover, resource block starting point and number of resource blocks can be indicated in PDCCH. Thereafter, an access terminal can decode PDCCH and interpret the coded bits in accordance to (S,M) for downlink assignments.

Referring to FIGS. 9-12, methodologies relating to utilizing flexible signaling schemes on a control channel in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 9:
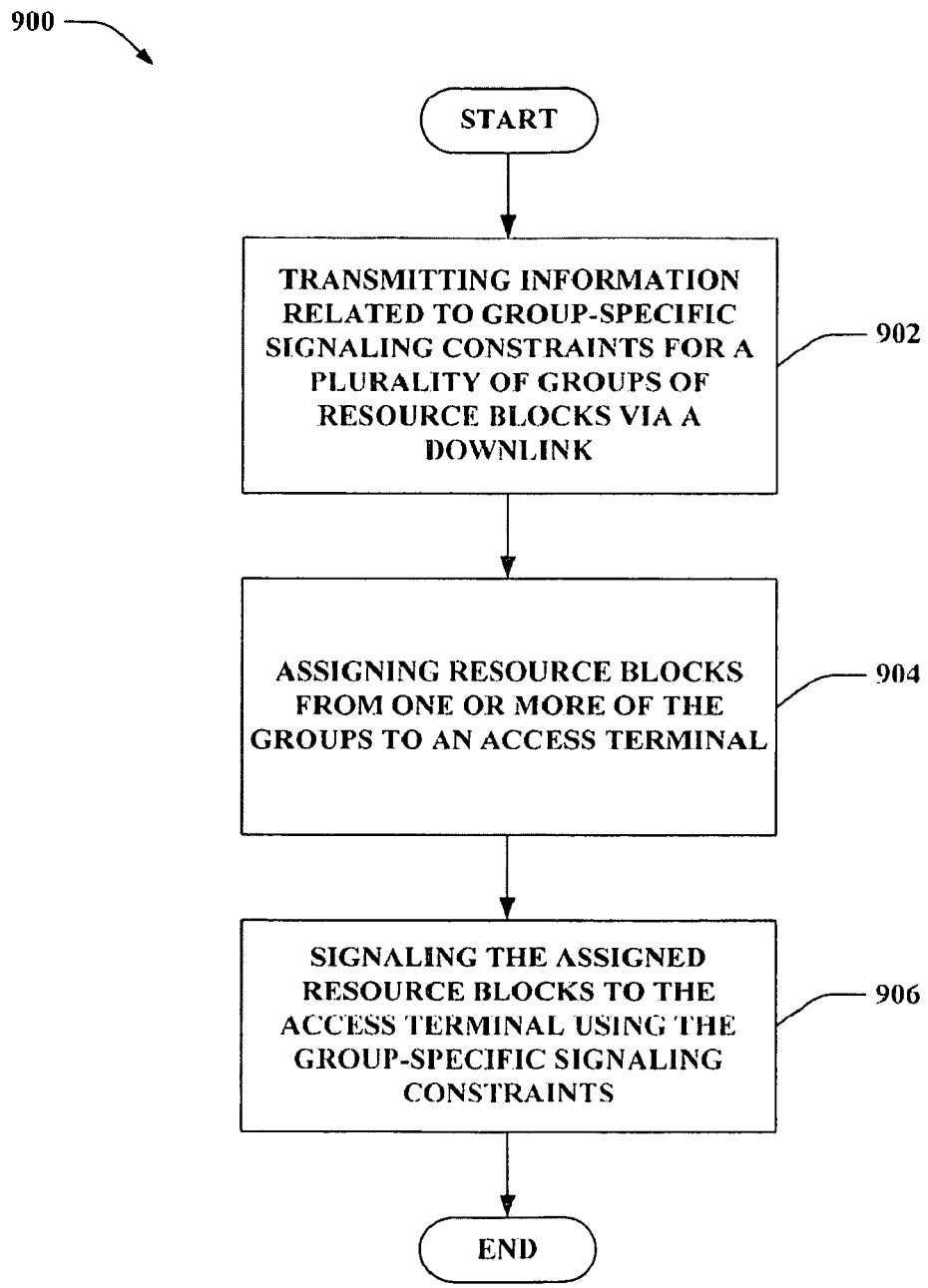
FIG. 9 is an illustration of an example methodology that facilitates allocating resource blocks of a channel in a wireless communication environment.

With reference to FIG. 9, illustrated is a methodology 900 that facilitates allocating resource blocks of a channel in a wireless communication environment. At 902, information related to group-specific signaling constraints for a plurality of groups of resource blocks can be transmitted via a downlink. For instance, a frequency band that includes any total number of available resource blocks can be utilized (e.g., R resource blocks, where R can be substantially any integer, . . . ). Further, the resource blocks can be associated with an uplink channel (e.g., Physical Uplink Shared Channel (PUSCH), . . . ) and/or a downlink channel (e.g., Physical Downlink Shared Channel (PDSCH), . . . ). The total number of available resource blocks in the frequency band can be split into the plurality of groups (e.g., subbands, . . . ). Each of the available resource blocks is included in one of the plurality of groups (e.g., a resource block may not be included in more than one group, . . . ). By way of example, the number of groups into which the total number of available resource blocks are divided can be determined (e.g., based upon preset instructions, number and/or type of access terminal(s) being served, applications being performed, base station specific property, time, . . . ). According to another illustration, the number of groups can be predetermined (e.g., retained in memory, . . . ). Moreover, the total number of available resource blocks can be split between the groups in any manner (e.g., division of resource blocks between groups can be preset, dynamically determined based upon preset instructions, number and/or type of access terminal(s) being served, applications being performed, base station specific property, time, . . . ); for instance, equal numbers of resource blocks can be included in more than one or all groups and/or differing number of resource blocks can be included in more than one or all groups. For instance, information related to the number of groups and/or the division of resource blocks between the plurality of groups can be sent to access terminal(s) in proximity (e.g., signaled via dynamic Broadcast Channel (BCH), . . . ).

Further, group-specific signaling constraints can be selected for each of the plurality of groups. Each group can have a set of corresponding signaling constraints for indicating allocation of resource blocks in that particular group. For instance, a group-specific signaling constraint can be a minimum resource block allocation unit to be utilized in a given group (e.g., the minimum allocation unit can be M resource block(s), where M can be substantially any integer, . . . ). Another group-specific signaling constraint can be a signaling structure used for a particular group. Example signaling structures can be a bitmap structure, a contiguous allocation structure, a tree-based structure, and so forth. By way of illustration, a first group that includes a first number of resource blocks can be associated with a first minimum allocation unit and a first signaling structure, a second group that includes a second number of resource blocks can be associated with a second minimum allocation unit and a second signaling structure, and so forth; the first and second number of resource blocks can be the same or different, the first and second minimum allocation unit can be the same or different, and/or the first and second signaling structure can be the same or different. Further, the group-specific signaling constraints can include information related to the selection of the group of resource blocks (e.g., resource blocks chosen to be included in the group, the group of resource blocks can be explicitly indicated, one or more disparate signaling constraints can be utilized within the group, . . . ). Moreover, information related to the group-specific signaling constraints associated with each of the groups can be sent to access terminals in proximity (e.g., over the dynamic BCH, . . . ); thus, a common understanding of the group-specific signaling constraints can be possessed within the wireless communication environment. Alternatively, it is contemplated that access terminals in proximity can determine as a function of instructions and/or retrieve from respective memories such group-specific signaling constraints.

At 904, resource blocks can be assigned from one or more of the groups to an access terminal. The assignment is generated in accordance with the group-specific signaling constraints for each group (e.g., allocate adjacent resource blocks in a group that uses a contiguous allocation signaling structure, allot one or more minimum allocation units in a group, . . . ). Further, frequency selective scheduling can be effectuated by allotting resource blocks from the one or more groups. According to an example, a particular group from which resource block(s) are allocated to the access terminal can be a function of application being performed (e.g., voice, streaming data, messaging, . . . ), number of access terminals being served, and so forth.

At 906, the assigned resource blocks can be signaled to the access terminal using the group-specific signaling constraints. For instance, the resource block allotments can be indicated via a control channel (e.g., Physical Downlink Control Channel (PDCCH), . . . ). By utilizing the plurality of groups, each with group-specific signaling constraints, the number of bits used to signal resource block assignments can be reduced while providing flexibility for scheduling/assigning resource block(s) to access terminals. Further, data communicated via the assigned resource blocks can be transmitted to and/or received from the access terminal.

Figure 10:
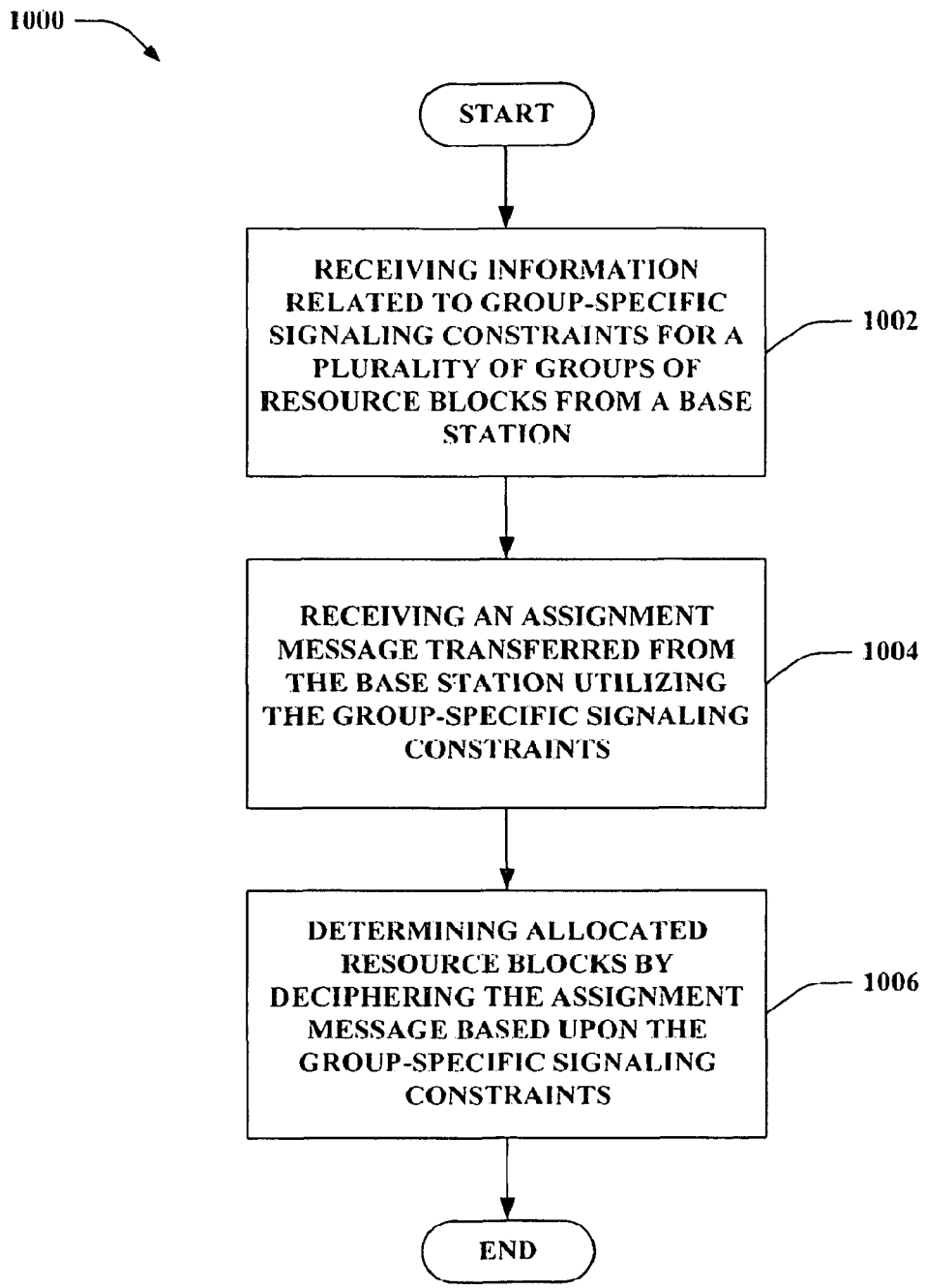
FIG. 10 is an illustration of an example methodology that facilitates obtaining resource block assignments in a wireless communication environment.

Now turning to FIG. 10, illustrated is a methodology 1000 that facilitates obtaining resource block assignments in a wireless communication environment. At 1002, information related to group-specific signaling constraints for a plurality of groups of resource blocks can be received from a base station. The resource blocks can be associated with an uplink channel (e.g., Physical Uplink Shared Channel (PUSCH), . . . ) and/or a downlink channel (e.g., Physical Downlink Shared Channel (PDSCH), . . . ). For instance, the information can pertain to a minimum resource block allocation unit to be utilized in a given group (e.g., the minimum allocation unit can be M resource block(s), where M can be substantially any integer, . . . ). Additionally or alternatively, the information can relate to a signaling structure used for a particular group (e.g., a bitmap structure, a contiguous allocation structure, a tree-based structure, . . . ). Further, the information can relate to a number of groups of resource blocks, a number of resource blocks in each group, particular resource blocks selected to be included in each group, and so forth. The information, for example, can be received via a broadcast channel. Upon receiving this information, the group-specific signaling constraints can be stored in memory. It is also contemplated that disparate information pertaining to disparate group-specific signaling constraints sent by a disparate base station (or more than one base station) can similarly be obtained and/or retained in memory.

At 1004, an assignment message transferred from the base station utilizing the group-specific signaling constraints can be received. The assignment message can be obtained via a control channel (e.g., Physical Downlink Control Channel (PDCCH), . . . ). At 1006, allocated resource blocks can be determined by deciphering the assignment message based upon the group-specific signaling constraints. For example, the allocated resource blocks can be a subset of the total resource blocks available. Further, the allocated resource blocks can be from one or more of the plurality of groups. Moreover, upon deciphering the assignment message, the allocated resource blocks can be utilized to send data (e.g., if related to an uplink channel, . . . ) or receive data (e.g., if related to a downlink channel, . . . ).

Figure 11:
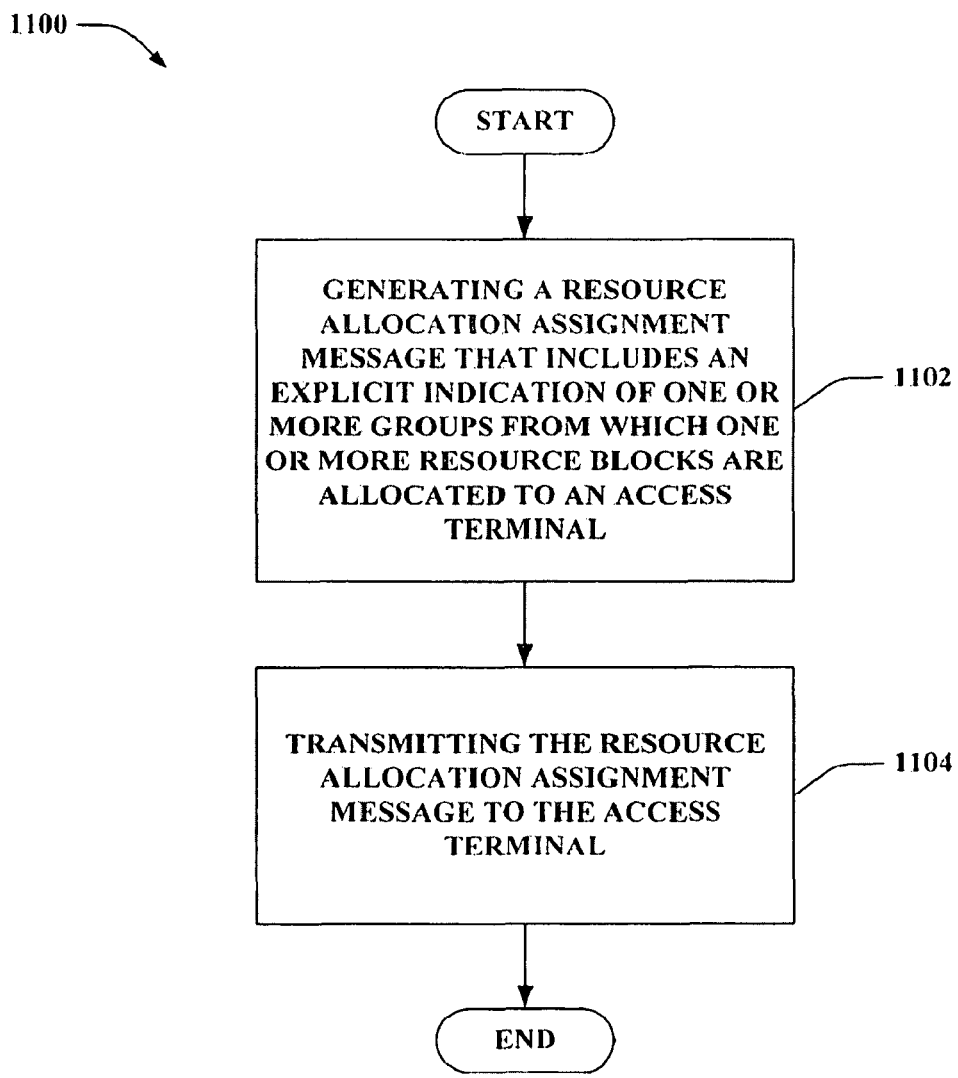
FIG. 11 is an illustration of an example methodology that facilitates assigning resources blocks of a channel in a wireless communication environment.

With reference to FIG. 11, illustrated is a methodology 1100 that facilitates assigning resources blocks of a channel in a wireless communication environment. At 1102, a resource allocation assignment message that includes an explicit indication of one or more groups from which one or more resource blocks are allocated to an access terminal can be generated. For instance, signaling of the allocated one or more resource blocks can be effectuated utilizing respective, group-specific signaling constraints for each of the one or more groups. The following describes further aspects associated with generating the resource allocation assignment message. In resource allocations of type 1, a bitmap size of $\lceil N_{RB}^{DL}/P \rceil$ indicates to a scheduled access terminal the physical resource block(s) (PRBs) (e.g., resource blocks, . . . ) from the set of PRBs from one of P resource block subsets. Also, P is the resource block group size associated with the system bandwidth. The portion of the bitmap used to address PRBs in a selected resource block group (RBG) subset has size $N_{RB}^{TYPE1}$ and can be defined as: $N_{RB}^{TYPE1} = \lceil N_{RB}^{DL}/P \rceil - \lceil \log_2(P) \rceil - 1$, where $\lceil N_{RB}^{DL}/P \rceil$ is the overall bitmap size and $\lceil \log_2(P) \rceil$ is the minimum number of bits needed to select one of the P RBG subsets. Moreover, one additional bit is used to indicate whether the addressable PRBs of the selected RBG subset is left justified or right justified (e.g., right shifted) where the shift is used for full resource block granular addressability of all PRBs in a carrier since the number of PRBs in a RBG subset is larger than the PRB addressing portion of the bitmap as indicated by $N_{RB}^{TYPE1} < \lceil N_{RB}^{DL}/P \rceil$. Each bit in the PRB addressing portion of the bitmap addresses a single addressable PRB in the selected RBG subset starting at the left most addressable PRB. At 1104, the resource allocation assignment message can be transmitted to the access terminal.

Figure 12:
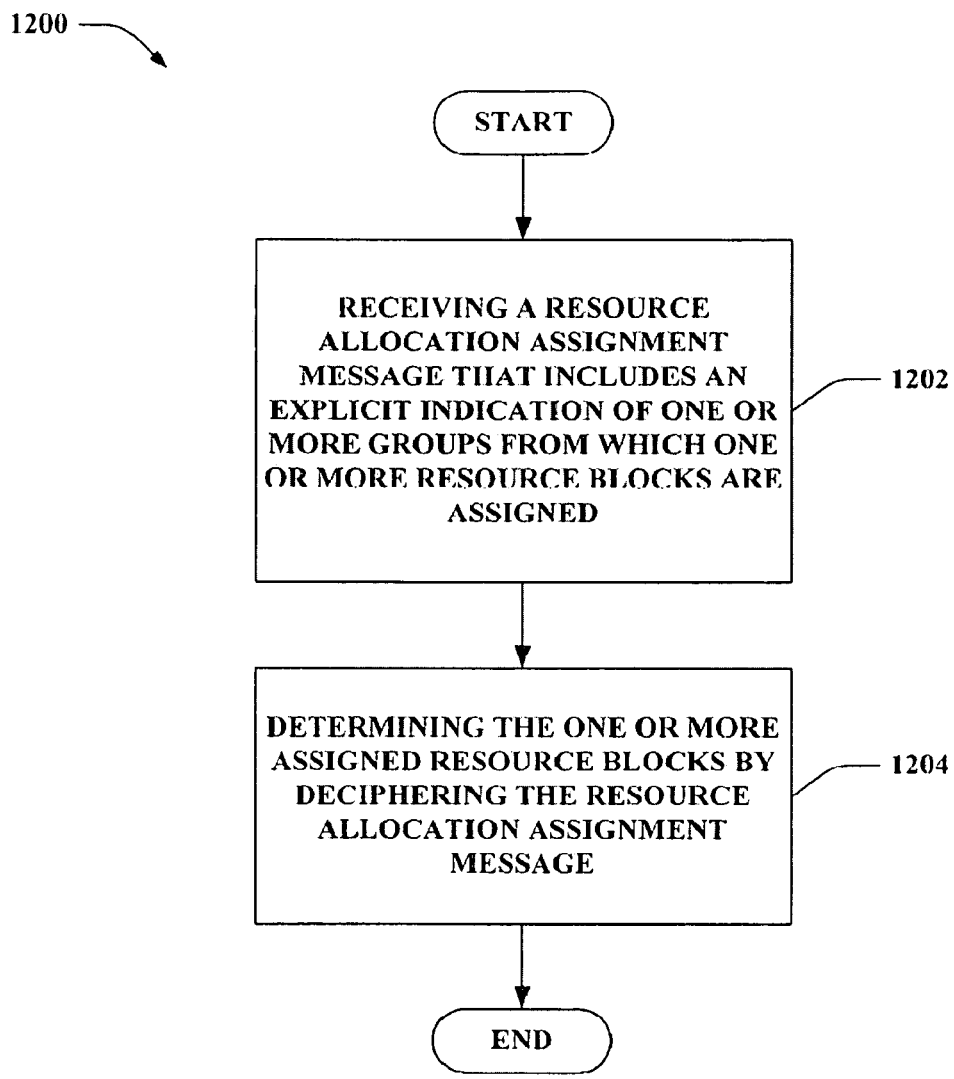
FIG. 12 is an illustration of an example methodology that facilitates receiving resource block assignments in a wireless communication environment.

Now referring to FIG. 12, illustrated is a methodology 1200 that facilitates receiving resource block assignments in a wireless communication environment. At 1202, a resource allocation assignment message that includes an explicit indication of one or more groups from which one or more resource blocks are assigned can be received. By way of illustration, the resource allocation assignment message can be transferred from a base station utilizing group-specific signaling constraints. At 1204, the one or more assigned resource blocks can be determined by deciphering the resource allocation assignment message. For example, in resource allocations of type 1, a bitmap size of $\lceil N_{RB}^{DL}/P \rceil$ indicates physical resource block(s) (PRBs) (e.g., resource blocks, . . . ) from a set of PRBs from one of P resource block subsets that can be assigned. Also, P is the resource block group size associated with the system bandwidth. The portion of the bitmap used to address PRBs in a selected resource block group (RBG) subset has size $N_{RB}^{TYPE1}$ and can be defined as: $N_{RB}^{TYPE1} = \lceil N_{RB}^{DL}/P \rceil - \lceil \log_2(P) \rceil - 1$, where $\lceil N_{RB}^{DL}/P \rceil$ is the overall bitmap size and $\lceil \log_2(P) \rceil$ is the minimum number of bits needed to select one of the P RBG subsets. Moreover, one additional bit is used to indicate whether the addressable PRBs of the selected RBG subset is left justified or right justified (e.g., right shifted) where the shift is used for full resource block granular addressability of all PRBs in a carrier since the number of PRBs in a RBG subset is larger than the PRB addressing portion of the bitmap as indicated by $N_{RB}^{TYPE1} < \lceil N_{RB}^{DL}/P \rceil -$. Each bit in the PRB addressing portion of the bitmap addresses a single addressable PRB in the selected RBG subset starting at the left most addressable PRB.

It will be appreciated that, in accordance with one or more aspects described herein, inferences can be made regarding employing flexible signaling of resource blocks. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining signaling constraints to use for a given group of resource blocks. By way of further illustration, an inference can be made related to determining signaling constraints used by a base station to send resource block assignments over a downlink control channel. It will be appreciated that the foregoing examples are illustrative in nature and are not intended to limit the number of inferences that can be made or the manner in which such inferences are made in conjunction with the various embodiments and/or methods described herein.

Figure 13:
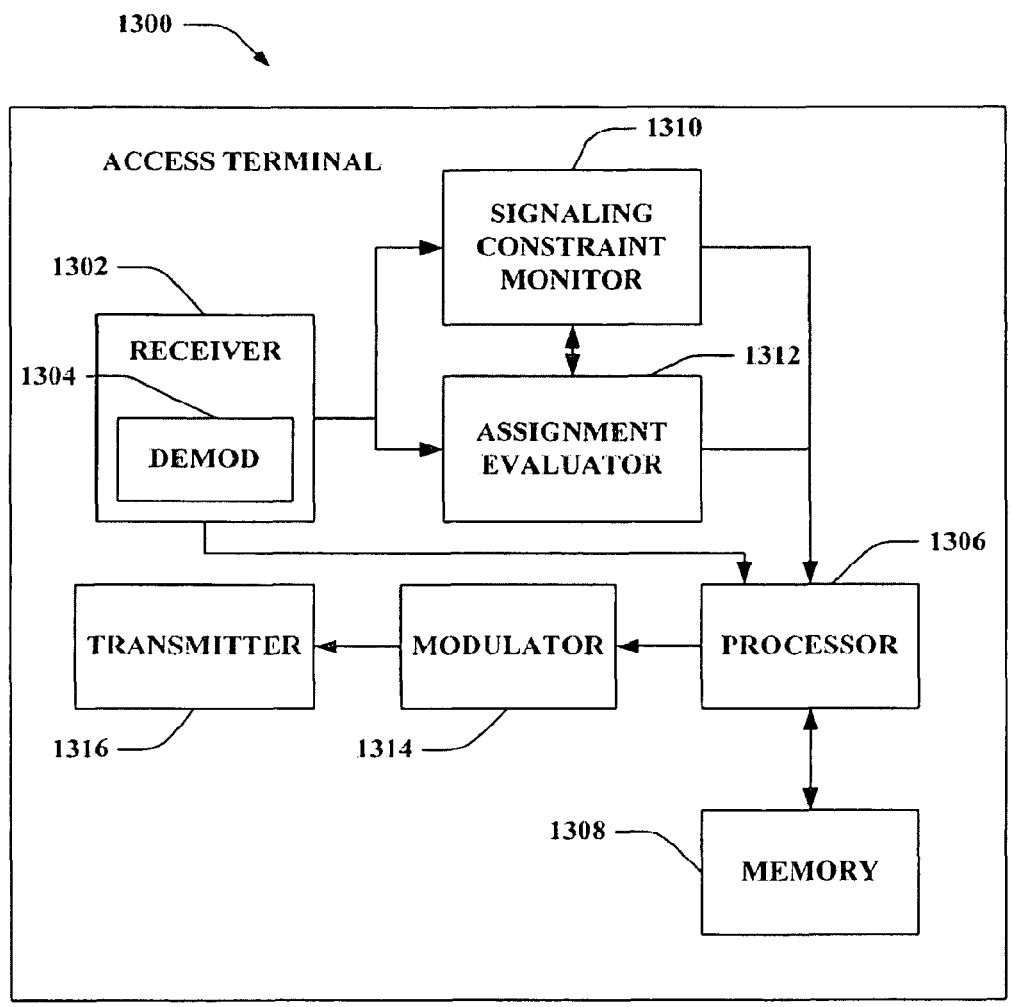
FIG. 13 is an illustration of an example access terminal that obtains and/or utilizes resource block assignments in a wireless communication system.

FIG. 13 is an illustration of an access terminal 1300 that obtains and/or utilizes resource block assignments in a wireless communication system. Access terminal 1300 comprises a receiver 1302 that receives a signal from, for instance, a receive antenna (not shown), and performs typical actions thereon (e.g., filters, amplifies, downconverts, etc.) the received signal and digitizes the conditioned signal to obtain samples. Receiver 1302 can be, for example, an MMSE receiver, and can comprise a demodulator 1304 that can demodulate received symbols and provide them to a processor 1306 for channel estimation. Processor 1306 can be a processor dedicated to analyzing information received by receiver 1302 and/or generating information for transmission by a transmitter 1316, a processor that controls one or more components of access terminal 1300, and/or a processor that both analyzes information received by receiver 1302, generates information for transmission by transmitter 1316, and controls one or more components of access terminal 1300.

Access terminal 1300 can additionally comprise memory 1308 that is operatively coupled to processor 1306 and that can store data to be transmitted, received data, and any other suitable information related to performing the various actions and functions set forth herein. For instance, memory 1308 can store group-specific signaling constraints employed by one or more base stations. Memory 1308 can additionally store protocols and/or algorithms associated with identifying signaling constraints used for communicating resource block assignments and/or employing such signaling constraints to analyze received assignment messages.

It will be appreciated that the data store (e.g., memory 1308) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1308 of the subject systems and methods is intended to comprise, without being limited to, these and any other suitable types of memory.

Receiver 1302 is further operatively coupled to a signaling constraint monitor 1310 and/or an assignment evaluator 1312, which can be substantially similar to signaling constraint monitor 212 of FIG. 2 and assignment evaluator 214 of FIG. 2, respectively. Signaling constraint monitor 1310 can receive and/or evaluate information received from one or more base stations to gain an understanding of group-specific signaling constraints respectively employed by each of the one or more base stations. For instance, signaling constraint monitor 1310 can obtain such information via a broadcast channel. By way of illustration, upon determining the group-specific signaling constraints, signaling constraint monitor 1310 can enable storing the group-specific signaling constraints in memory 1308. Moreover, assignment evaluator 1312 can use the group-specific signaling constraints to analyze received resource block assignment messages. Thus, assignment evaluator 1312 can recognize resource block(s) allocated to access terminal 1300, and hence, access terminal 1300 can transmit and/or receive data by leveraging these allocated resource block(s). Access terminal 1300 still further comprises a modulator 1314 and a transmitter 1316 that transmits the signal to, for instance, a base station, another access terminal, etc. Although depicted as being separate from the processor 1306, it is to be appreciated that signaling constraint monitor 1310, assignment evaluator 1312 and/or modulator 1314 can be part of processor 1306 or a number of processors (not shown).

Figure 14:
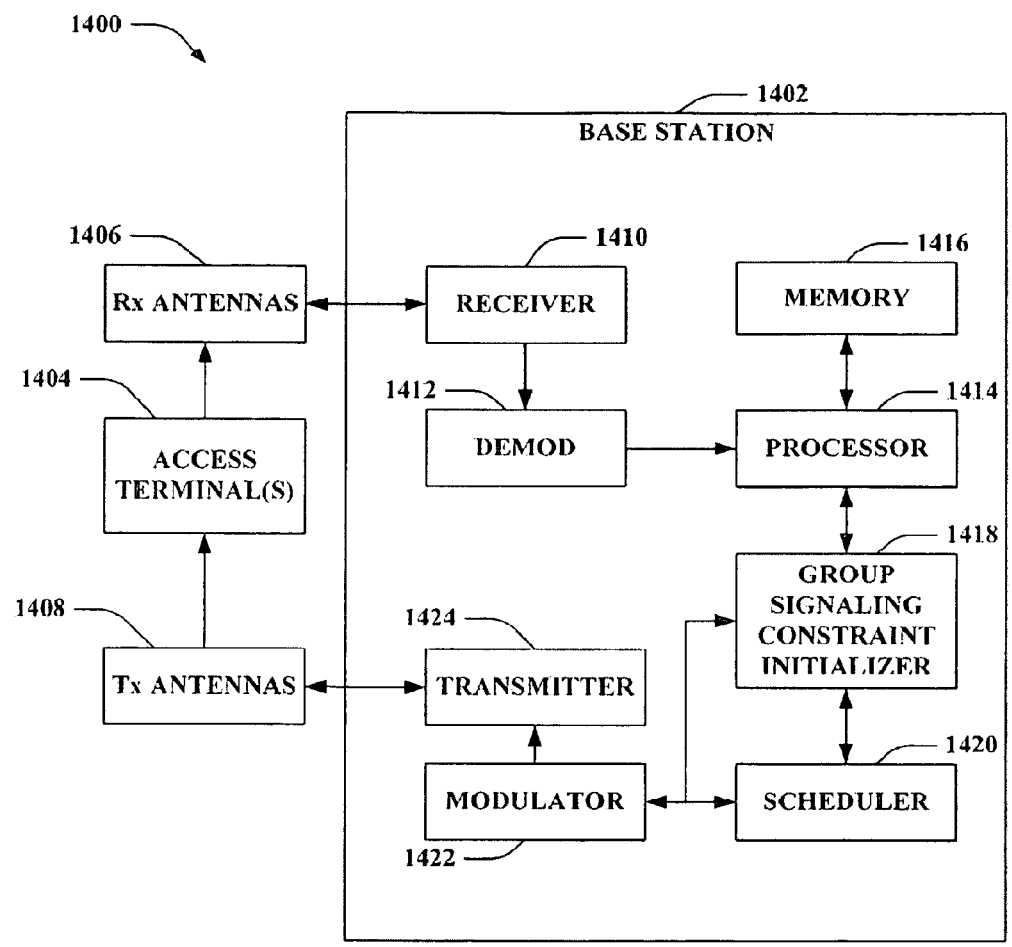
FIG. 14 is an illustration of an example system that facilitates allocating resource blocks to access terminal(s) via employing a flexible signaling scheme in a wireless communication environment.

FIG. 14 is an illustration of a system 1400 that facilitates allocating resource blocks to access terminal(s) via employing a flexible signaling scheme in a wireless communication environment. System 1400 comprises a base station 1402 (e.g., access point, . . . ) with a receiver 1410 that receives signal(s) from one or more access terminals 1404 through a plurality of receive antennas 1406, and a transmitter 1422 that transmits to the one or more access terminals 1404 through a transmit antenna 1408. Receiver 1410 can receive information from receive antennas 1406 and is operatively associated with a demodulator 1412 that demodulates received information. Demodulated symbols are analyzed by a processor 1414 that can be similar to the processor described above with regard to FIG. 13, and which is coupled to a memory 1416 that stores data to be transmitted to or received from access terminal(s) 1404 (or a disparate base station (not shown)) and/or any other suitable information related to performing the various actions and functions set forth herein. Processor 1414 is further coupled to a group signaling constraint initializer 1418 that implements group-specific signaling constraints and/or sends information associated with such group-specific signaling constraints to access terminal(s) 1404. Group signaling constraint initializer 1418 can be operatively coupled to a scheduler 1420 that assigns respective resource block(s) from one or more groups to one or more access terminal(s) 1404 using the group-specific signaling constraints. Indications can be sent to the one or more access terminal(s) 1404 by scheduler 1420 employing the group-specific signaling constraints. It is contemplated that group signaling constraint initializer 1418 can be substantially similar to group signaling constraint initializer 208 of FIG. 2 and/or scheduler 1420 can be substantially similar to scheduler 210 of FIG. 2. Further, group signaling constraint initializer 1418 and/or scheduler 1420 can provide information to be transmitted to a modulator 1422. Modulator 1422 can multiplex a frame for transmission by a transmitter 1426 through antennas 1408 to access terminal(s) 1404. Although depicted as being separate from the processor 1414, it is to be appreciated that group signaling constraint initializer 1418, scheduler 1420 and/or modulator 1422 can be part of processor 1414 or a number of processors (not shown).

Figure 15:
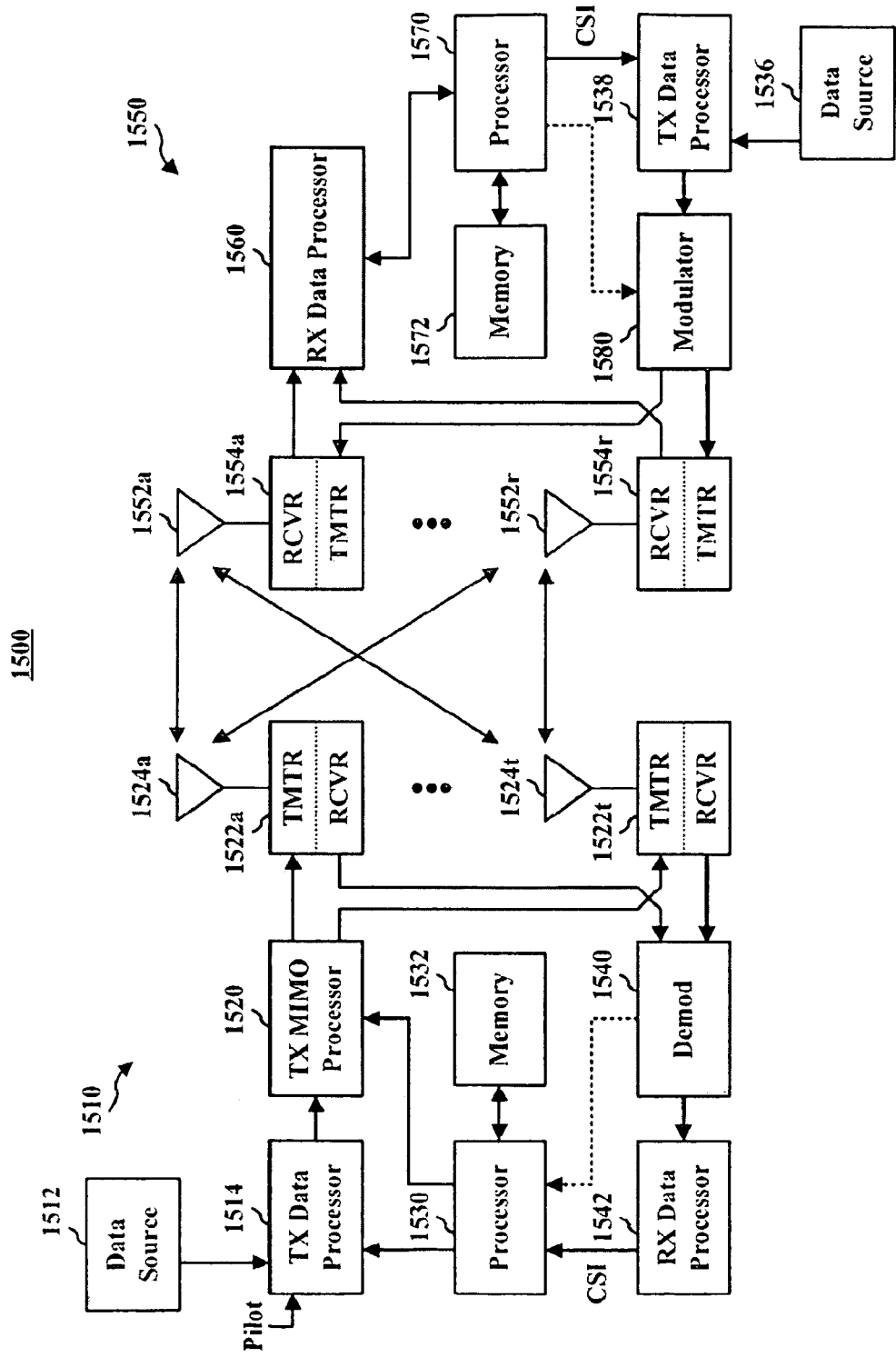
FIG. 15 is an illustration of an example wireless network environment that can be employed in conjunction with the various systems and methods described herein.

FIG. 15 shows an example wireless communication system 1500. The wireless communication system 1500 depicts one base station 1510 and one access terminal 1550 for sake of brevity. However, it is to be appreciated that system 1500 can include more than one base station and/or more than one access terminal, wherein additional base stations and/or access terminals can be substantially similar or different from example base station 1510 and access terminal 1550 described below. In addition, it is to be appreciated that base station 1510 and/or access terminal 1550 can employ the systems (FIGS. 1-3, 13-14, and 16-19) and/or methods (FIGS. 9-10) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At access terminal 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and down-converts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from access terminal 1550 are received by antennas 1524, conditioned by receivers 1522, demodulated by a demodulator 1540, and processed by a RX data processor 1542 to extract the reverse link message transmitted by access terminal 1550. Further, processor 1530 can process the extracted message to determine which precoding matrix to use for determining the beamforming weights.

Processors 1530 and 1570 can direct (e.g., control, coordinate, manage, etc.) operation at base station 1510 and access terminal 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 16:
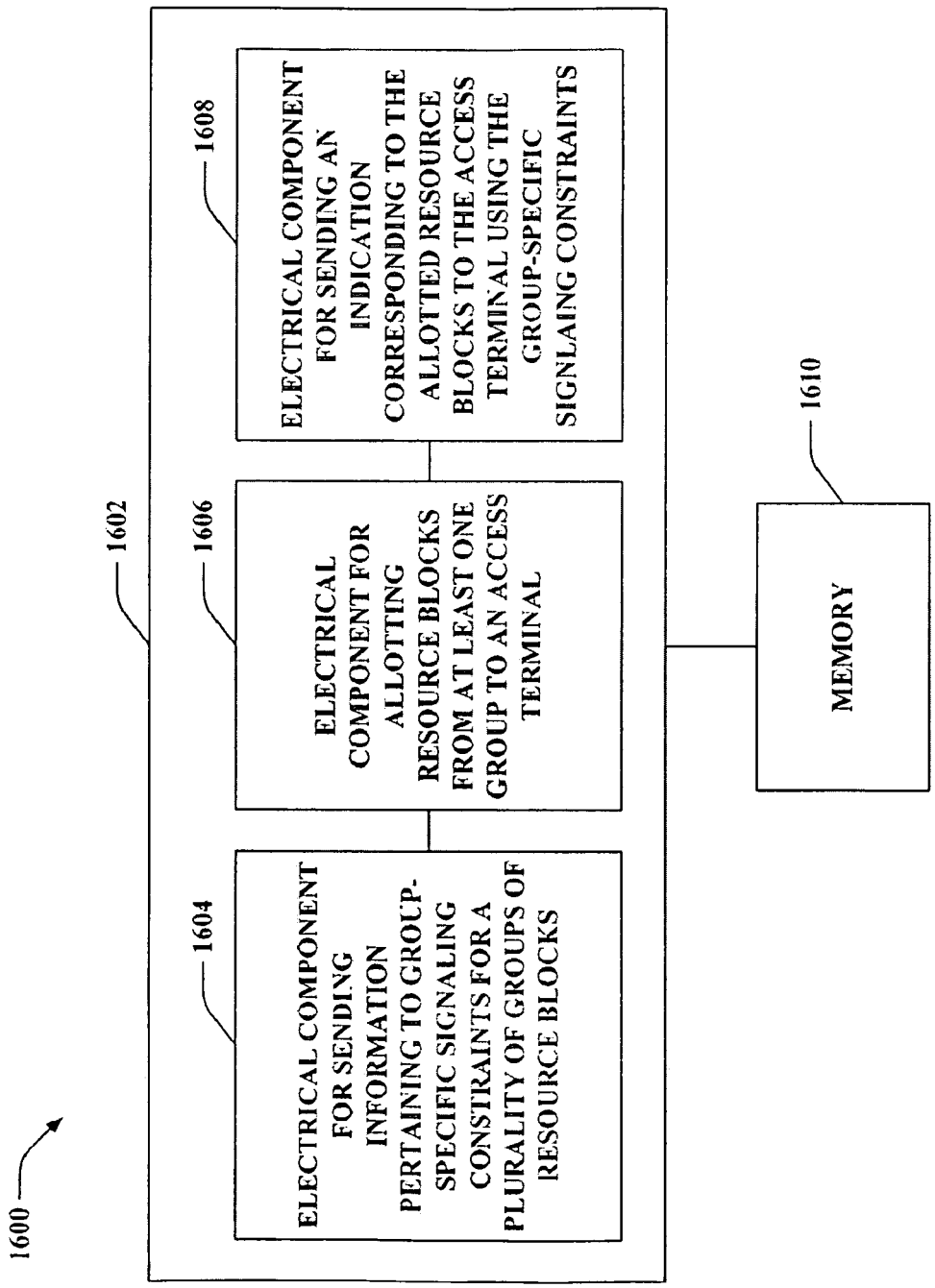
FIG. 16 is an illustration of an example system that enables utilizing a flexible scheme for signaling resource block assignments in a wireless communication environment.

With reference to FIG. 16, illustrated is a system 1600 that enables utilizing a flexible scheme for signaling resource block assignments in a wireless communication environment. For example, system 1600 can reside at least partially within a base station. It is to be appreciated that system 1600 is represented as including functional blocks, which can be functional blocks that represent functions implemented by a processor, software, or combination thereof (e.g., firmware).

System 1600 includes a logical grouping 1602 of electrical components that can act in conjunction. For instance, logical grouping 1602 can include an electrical component for sending information pertaining to group-specific signaling constraints for a plurality of groups of resource blocks 1604. For instance, the information can be transferred over a broadcast channel (e.g., dynamic Broadcast Channel (BCH), . . . ). Further, the information can relate to group-specific minimum allocation units, group-specific signaling structures, number of groups, number of resource blocks within respective groups, and so forth. Further, logical grouping 1602 can include an electrical component for allotting resource blocks from at least one group to an access terminal 1606. Moreover, logical grouping 1602 can comprise an electrical component for sending an indication corresponding to the allotted resource blocks to the access terminal using the group-specific signaling constraints 1608. For example, the indication can be transferred over a control channel (e.g., Physical Downlink Control Channel (PDCCH), . . . ). Additionally, system 1600 can include a memory 1610 that retains instructions for executing functions associated with electrical components 1604, 1606, and 1608. While shown as being external to memory 1610, it is to be understood that one or more of electrical components 1604, 1606, and 1608 can exist within memory 1610.

Figure 17:
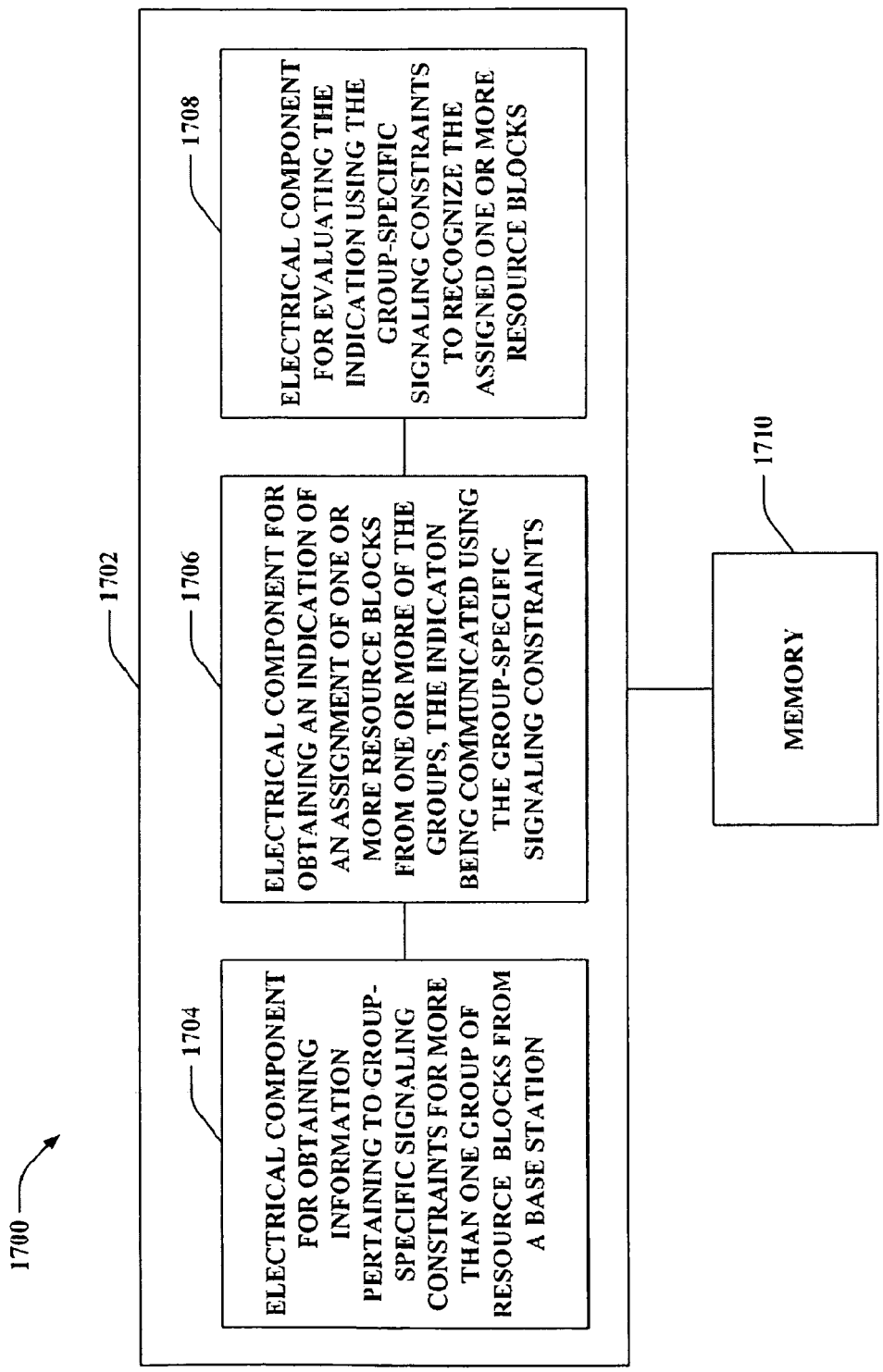
FIG. 17 is an illustration of an example system that enables employing resource blocks assigned via a flexible signaling scheme in a wireless communication environment.

Turning to FIG. 17, illustrated is a system 1700 that enables employing resource blocks assigned via a flexible signaling scheme in a wireless communication environment. System 1700 can reside within an access terminal, for instance. As depicted, system 1700 includes functional blocks that can represent functions implemented by a processor, software, or combination thereof (e.g., firmware). System 1700 includes a logical grouping 1702 of electrical components that can act in conjunction. Logical grouping 1702 can include an electrical component for obtaining information pertaining to group-specific signaling constraints for more than one group of resource blocks from a base station 1704. Further, logical grouping 1702 can include an electrical component for obtaining an indication of an assignment of one or more resource blocks from one or more of the groups, where the indication can be communicated using the group-specific signaling constraints 1706. Moreover, logical grouping 1702 can include an electrical component for evaluating the indication using the group-specific signaling constraints to recognize the assigned one or more resource blocks 1708. Additionally, system 1700 can include a memory 1710 that retains instructions for executing functions associated with electrical components 1704, 1706, and 1708. While shown as being external to memory 1710, it is to be understood that electrical components 1704, 1706, and 1708 can exist within memory 1710.

Figure 18:
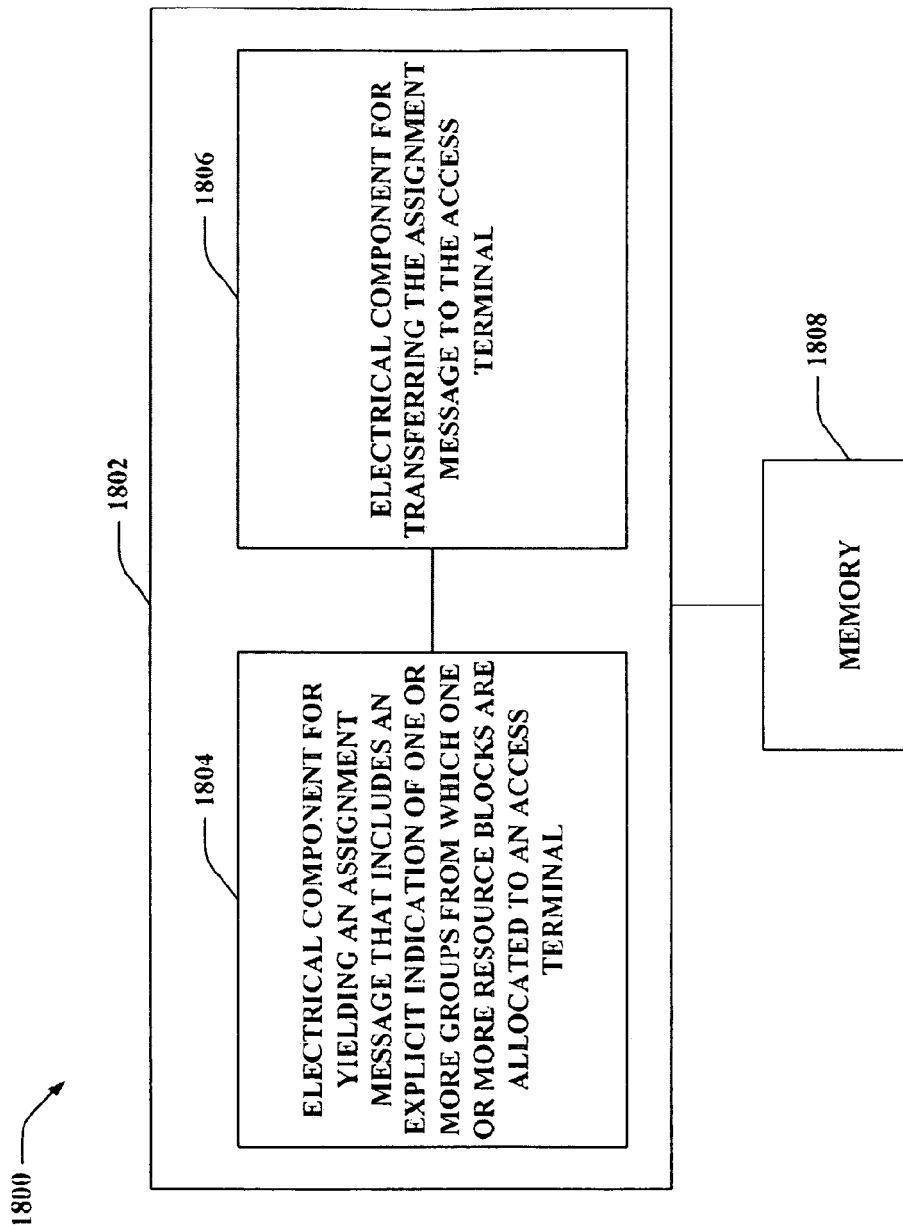
FIG. 18 is an illustration of an example system that enables signaling resource block assignments in a wireless communication environment.

With reference to FIG. 18, illustrated is a system 1800 that enables signaling resource block assignments in a wireless communication environment. For example, system 1800 can reside at least partially within a base station. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component yielding an assignment message that includes an explicit indication of one or more groups from which one or more resource blocks are allocated to an access terminal 1804. Further, logical grouping 1802 can include an electrical component for transferring the assignment message to the access terminal 1806. Additionally, system 1800 can include a memory 1808 that retains instructions for executing functions associated with electrical components 1804 and 1806. While shown as being external to memory 1808, it is to be understood that one or more of electrical components 1804 and 1806 can exist within memory 1808.

Figure 19:
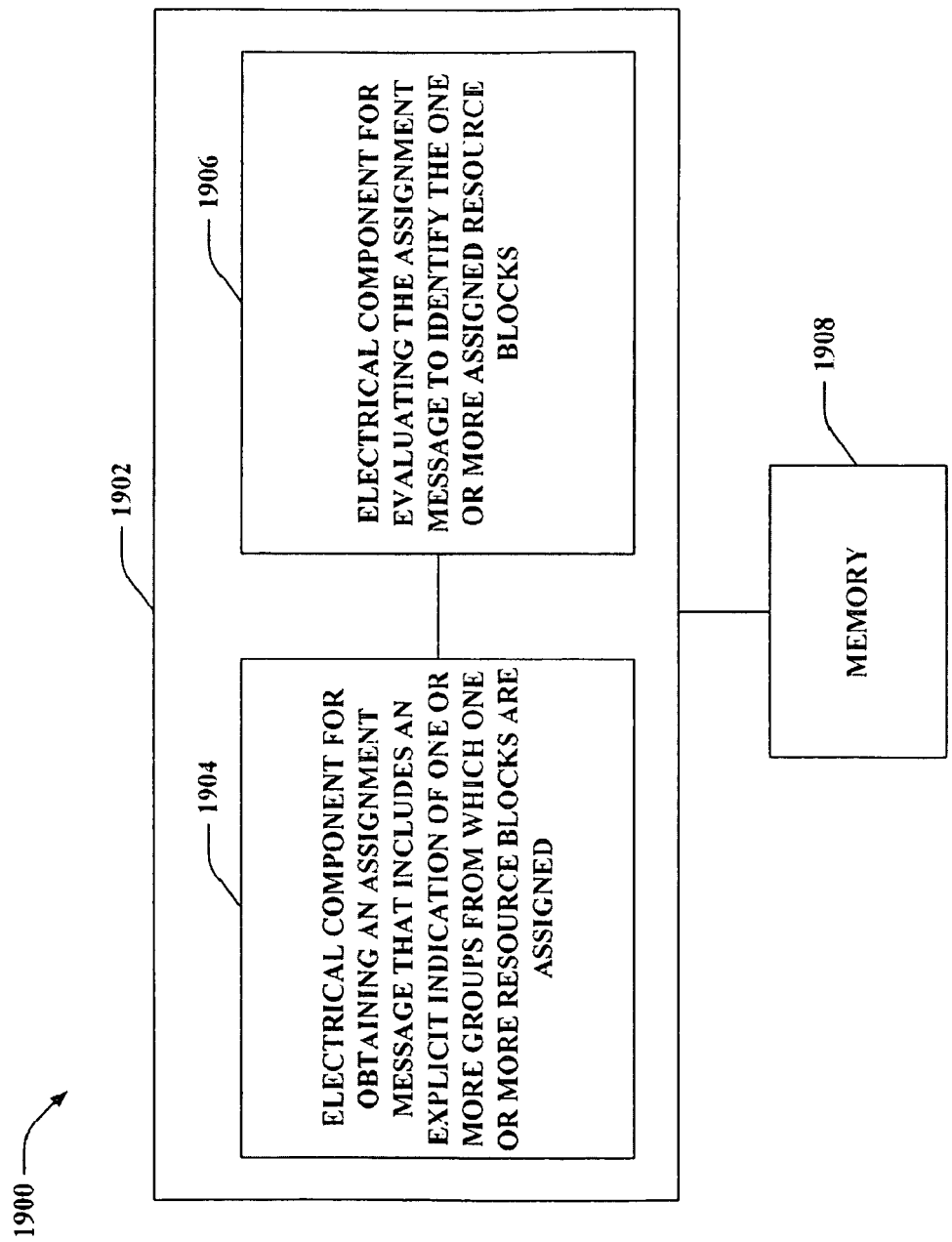
FIG. 19 is an illustration of an example system that enables employing allocated resource blocks in a wireless communication environment.

Turning to FIG. 19, illustrated is a system 1900 that enables employing allocated resource blocks in a wireless communication environment. System 1900 can reside within an access terminal, for instance. As depicted, system 1900 includes functional blocks that can represent functions implemented by a processor, software, or combination thereof (e.g., firmware). System 1900 includes a logical grouping 1902 of electrical components that can act in conjunction. Logical grouping 1902 can include an electrical component for obtaining an assignment message that includes an explicit indication of one or more groups from which one or more resource blocks are assigned 1904. Moreover, logical grouping 1902 can include an electrical component for evaluating the assignment message to identify the one or more assigned resource blocks 1906. Additionally, system 1900 can include a memory 1908 that retains instructions for executing functions associated with electrical components 1904 and 1906. While shown as being external to memory 1908, it is to be understood that electrical components 1904 and 1906 can exist within memory 1908.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates allocating resource blocks of a channel in a wireless communication environment, comprising:
    transmitting information related to group-specific signaling constraints for each of one or more groups of resource blocks via a downlink, wherein each of the one or more groups includes a non-overlapping set of resource blocks for assigning to access terminals, wherein the group-specific signaling constraints for a respective group indicate the assignment of resource blocks from that group to one or more of the access terminals based at least in part on a respective minimum number of resource block allocation units for that group, and wherein the minimum number of resource block allocation units for each of the one or more groups is dependent on a system bandwidth for the downlink;
    assigning resource blocks from one or more of the groups to one of the access terminals; and
    signaling the assigned resource blocks to the one access terminal using the group-specific signaling constraints.

2. The method of claim 1, wherein the resource blocks are associated with a Physical Uplink Shared Channel (PUSCH).

3. The method of claim 1, wherein the resource blocks are associated with a Physical Downlink Shared Channel (PDSCH).

4. The method of claim 1, further comprising splitting the resource blocks into the one or more groups, wherein each of the resource blocks is included in one of the one or more groups.

5. The method of claim 1, further comprising selecting the group-specific signaling constraints for each of the one or more groups.

6. The method of claim 1, wherein the group-specific signaling constraints include respective signaling structures for each of the one or more groups.

7. The method of claim 6, wherein each of the respective signaling structures is one of a bitmap structure, or a contiguous allocation structure.

8. The method of claim 1, wherein the group-specific signaling constraints include respective explicit indications of resource blocks included in each of the one or more groups.

9. The method of claim 1, further comprising transmitting the information related to the group-specific signaling constraints to the access terminals in proximity via a broadcast channel.

10. The method of claim 1, further comprising assigning the resource blocks in accordance with the group-specific signaling constraints for each of the one or more groups.

11. The method of claim 1, further comprising signaling the assigned resource blocks via a Physical Downlink Control Channel (PDCCH).

12. A wireless communications apparatus, comprising:
a memory that retains instructions related to allocating resource blocks from one or more groups of resource blocks to one or more access terminals based at least in part upon group-specific signaling constraints, wherein each of the one or more groups includes a non-overlapping set of resource blocks, and the instructions are further related to transferring an indication of the resource block allocation to the access terminal using the group-specific signaling constraints, wherein the group-specific signaling constraints for a respective group indicate the assignment of resource blocks from that group to one or more of the access terminals based at least in part on a respective minimum number of resource block allocation units for that group, and wherein the minimum number of resource block allocation units for each of the one or more groups is dependent on a system bandwidth; and
a processor, coupled to the memory, configured to execute the instructions retained in the memory.

13. The wireless communications apparatus of claim 12, wherein the memory further retains instruction related to segmenting a total number of resource blocks associated with a channel into the one or more groups, wherein each of the resource blocks is included in one of the one or more groups.

14. The wireless communications apparatus of claim 12, wherein the memory further retains instructions related to transferring information related to the group-specific signaling constraints for the one or more groups of the resource blocks to at least one of the one or more access terminals in proximity via a broadcast channel.

15. The wireless communications apparatus of claim 12, wherein the resource blocks are associated with an uplink data channel.

16. The wireless communications apparatus of claim 12, wherein the resource blocks are associated with a downlink data channel.

17. The wireless communications apparatus of claim 12, wherein the memory further retains instructions related to determining the group-specific signaling constraints.

18. The wireless communications apparatus of claim 12, wherein the group-specific signaling constraints include respective signaling structures for each of the one or more groups, each of the respective signaling structures being one of a bitmap structure, or a contiguous allocation structure.

19. The wireless communications apparatus of claim 12, wherein the group-specific signaling constraints include respective explicit indications of selections of resource blocks for each of the one or more groups.

20. The wireless communications apparatus of claim 12, wherein the memory further retains instruction related to transferring the indication of the resource block allocation via a control channel.

21. A wireless communications apparatus that enables utilizing a flexible scheme for signaling resource block assignments in a wireless communication environment, comprising:
means for sending information pertaining to group-specific signaling constraints for each of one or more groups of resource blocks, wherein each of the one or more groups includes a non-overlapping set of resource blocks for assigning to access terminals, wherein the group-specific signaling constraints for a respective group indicate the assignment of resource blocks from that group to one of more of the access terminals based at least in part on a respective minimum number of resource block allocation units for that group, and wherein the minimum number of resource block allocation units for each of the one or more groups is dependent on a system bandwidth;
means for allotting resource blocks from at least one group to one of the access terminals; and
means for sending an indication corresponding to the allotted resource blocks to the one access terminal using the group-specific signaling constraints.

22. The wireless communications apparatus of claim 21, further comprising means for separating the resource blocks into the one or more groups.

23. The wireless communications apparatus of claim 21, further comprising means for determining the group-specific signaling constraints for each of the one or more groups.

24. The wireless communications apparatus of claim 21, wherein the group-specific signaling constraints include respective signaling structures for each of the one or more groups, each of the respective signaling structures being one of a bitmap structure, or a contiguous allocation structure.

25. The wireless communications apparatus of claim 24, wherein a first group of the one or more groups is associated with a first signaling structure that differs from a second signaling structure associated with a second group of the one or more groups.

26. The wireless communications apparatus of claim 21, wherein the group-specific signaling constraints include respective explicit indications of resource blocks included in each of the one or more groups.

27. The wireless communications apparatus of claim 21, further comprising means for sending the indication corresponding to the allotted resource blocks via a control channel.

28. A non-transitory computer-readable medium storing executable code comprising:
code for transferring information pertaining to group-specific signaling constraints for each of one or more groups of resource blocks, wherein each of the one or more groups includes a non-overlapping set of resource blocks for assigning to access terminals, wherein the group-specific signaling constraints for a respective group indicate the assignment of resource blocks from that group to one of more of the access terminals based at least in part on a respective number of minimum resource block allocation units for that group and wherein the minimum number of resource block allocation units for each of the one or more groups is dependent on a system bandwidth;

code for allotting resource blocks from at least one group to one of the access terminals; and code for transmitting an indication corresponding to the allotted resource blocks to the one access terminal using the group-specific signaling constraints.

29. The computer-readable medium of claim 28, further comprising code for separating the resource blocks into the one or more groups.

30. The computer-readable medium of claim 28, further comprising code for determining the group-specific signaling constraints for each of the one or more groups.

31. The computer-readable medium of claim 28, wherein the group-specific signaling constraints include respective signaling structures for each of the one or more groups, each of the respective signaling structures being one of a bitmap structure, or a contiguous allocation structure.

32. The computer-readable medium of claim 28, wherein the group-specific signaling constraints include respective explicit information concerning selections of resource blocks included in each of the one or more groups.

33. The computer-readable medium of claim 28, further comprising code for transmitting the indication corresponding to the allotted resource blocks via a Physical Downlink Control Channel (PDCCH).

34. In a wireless communications system, an apparatus comprising:
a processor configured to:
transfer information pertaining to group-specific signaling constraints for each of one or more groups of resource blocks, wherein each of the one or more groups includes a non-overlapping set of resource blocks for assigning to access terminals, wherein the group-specific signaling constraints for a respective group indicate the assignment of resource blocks from that group to one of more of the access terminals based at least in part on a respective minimum number of resource block allocation units for that group, and wherein the minimum number of resource block allocation units for each of the one or more groups is dependent on a system bandwidth;
allocate resource blocks from one or more groups of resource blocks to one of the access terminals based at least in part upon the group-specific signaling constraints; and
transfer an indication of the resource block allocation to the one access terminal using the group-specific signaling constraints over a control channel.

35. A method that facilitates obtaining resource block assignments in a wireless communication environment, comprising:
receiving, from a base station, information related to group-specific signaling constraints for one or more groups of resource blocks, wherein each of the one or more groups includes a non-overlapping set of resource blocks for assigning to access terminals, wherein the group-specific signaling constraints for a respective group indicate the assignment of resource blocks from that group to one of more of the access terminals based at least in part on a minimum number of resource block allocation units for that group, and wherein the minimum number of resource block allocation units for each of the one or more groups is dependent on a system bandwidth;

receiving an assignment message transferred from the base station utilizing the group-specific signaling constraints; and determining allocated resource blocks by deciphering the assignment message based upon the group-specific signaling constraints.

36. The method of claim 35, wherein the resource blocks are associated with an uplink channel.

37. The method of claim 35, wherein the resource blocks are associated with a downlink channel.

38. The method of claim 35, wherein the group-specific signaling constraints relate to signaling structures for each of the one or more groups.

39. The method of claim 38, wherein each of the signaling structures is one of a bitmap structure, or a contiguous allocation structure.

40. The method of claim 35, wherein the group-specific signaling constraints relate to selection of resource blocks for each of the one or more groups.

41. The method of claim 35, further receiving information related to at least one of a number of the one or more groups or a number of resource blocks in each of the one or more groups.

42. The method of claim 35, further comprising storing the group-specific signaling constraints in memory.

43. The method of claim 42, further comprising:
receiving disparate information related to disparate group-specific signaling constraints from a disparate base station;
storing the disparate group-specific signaling constraints in the memory; and
utilizing the disparate group-specific signaling constraints when deciphering a disparate assignment message obtained from the disparate base station.

44. The method of claim 35, further comprising receiving the assignment message via a control channel.

45. The method of claim 35, wherein the allocated resource blocks are from one or more of the one or more groups.

46. A wireless communication apparatus, comprising:
a memory that retains instructions related to obtaining an assignment message transferred from a base station utilizing group-specific signaling constraints via a control channel, and determining assigned resource blocks from one or more groups of resource blocks by analyzing the assignment message with the group-specific signaling constraints, wherein each of the one or more groups includes a non-overlapping set of resource blocks for assigning to access terminals, wherein the group-specific signaling constraints for a respective group indicate the assignment of resource blocks from that group to one of more of the access terminals based at least in part on a minimum number of resource block allocation units for that group, and wherein the minimum number of resource block allocation units for each of the one or more groups is dependent on a system bandwidth; and
a processor, coupled to the memory, configured to execute the instructions retained in the memory.

47. The wireless communications apparatus of claim 46, wherein the memory further retains instructions related to obtaining information related to the group-specific signaling constraints for the one or more groups from the base station.

48. The wireless communications apparatus of claim 46, wherein the memory further retains instructions related to deriving the group-specific signaling constraints utilized by the base station when transferring the assignment message.

49. The wireless communications apparatus of claim 46, wherein the group-specific signaling constraints relate to signaling structures for each of the one or more groups, each of the signaling structures is one of a bitmap structure, or a contiguous allocation structure.

50. The wireless communications apparatus of claim 46, wherein the group-specific signaling constraints relate to selection of resource blocks included in each of the one or more groups.

51. The wireless communications apparatus of claim 46, wherein the memory further retains instructions related to receiving information related to at least one of a number of the one or more groups or a number of resource blocks in each of the one or more groups.

52. The wireless communications apparatus of claim 46, wherein the memory further retains instructions related to storing the group-specific signaling constraints.

53. A wireless communications apparatus that enables employing resource blocks assigned via a flexible signaling scheme in a wireless communication environment, comprising:
  means for obtaining, from a base station, information pertaining to group-specific signaling constraints for at least one group of resource blocks, wherein each of the at least one group includes a non-overlapping set of resource blocks for assigning to access terminals, wherein the group-specific signaling constraints for a respective group indicate the assignment of resource blocks from that group to one of more of the access terminals based at least in part on a minimum number of resource block allocation units for that group, and wherein the minimum number of resource block allocation units for each of the at least one group is dependent on a system bandwidth;
  means for obtaining an indication of an assignment of one or more resource blocks from one or more of the at least one group, the indication being communicated using the group-specific signaling constraints; and
  means for evaluating the indication using the group-specific signaling constraints to recognize the assigned one or more resource blocks.

54. The wireless communications apparatus of claim 53, wherein the group-specific signaling constraints relate to signaling structures for each of the at least one group, each of the signaling structures is one of a bitmap structure, or a contiguous allocation structure.

55. The wireless communications apparatus of claim 53, wherein the group-specific signaling constraints relate to selection of resource blocks included in each of the at least one group.

56. The wireless communications apparatus of claim 53, further comprising means for obtaining information related to at least one of a number of the at least one group or a number of resource blocks in each of the at least one group.

57. The wireless communications apparatus of claim 53, further comprising retaining the group-specific signaling constraints in memory.

58. A non-transitory computer-readable medium storing executable code comprising:
  code for receiving, from a base station via a broadcast channel, information pertaining to group-specific signaling constraints for at least one group of resource blocks wherein each of the at least one group includes a non-overlapping set of resource blocks for assigning to access terminals, wherein the group-specific signaling constraints for a respective group indicate the assignment of resource blocks from that group to one of more of the access terminals based at least in part on a minimum number of resource block allocation units for that group and wherein the minimum number of resource block allocation units for each of the at least one group is dependent on a system bandwidth;
  code for receiving an indication of an assignment of one or more resource blocks from one or more of the at least one group, the indication being communicated using the group-specific signaling constraints via a control channel; and
  code for evaluating the indication using the group-specific signaling constraints to recognize the assigned one or more resource blocks.

59. The computer-readable medium of claim 58, wherein the group-specific signaling constraints relate to signaling structures for each of the at least one group, each of the signaling structures is one of a bitmap structure, or a contiguous allocation structure.

60. The computer-readable medium of claim 58, wherein the group-specific signaling constraints relate to selection of resource blocks included in each of the at least one group.

61. The computer-readable medium of claim 58, further comprising code for receiving information related to at least one of a number of the at least one group or a number of resource blocks in each of the at least one group.

62. The computer-readable medium of claim 58, further comprising code for retaining the group-specific signaling constraints in memory.

63. In a wireless communications system, an apparatus comprising:
  a processor configured to:
  receive information, from a base station via a broadcast channel, pertaining to group-specific signaling constraints for one or more groups of resource blocks, wherein each of the one or more groups includes a non-overlapping set of resource blocks for assigning to access terminals, wherein the group-specific signaling constraints for a respective group indicate the assignment of resource blocks from that group to one of more of the access terminals based at least in part on a minimum number of resource block allocation units for that group, and wherein the minimum number of resource block allocation units for each of the one or more groups is dependent on a system bandwidth;
  receive an assignment message transferred from the base station utilizing the group-specific signaling constraints via a control channel; and
  determine assigned resource blocks from the one or more groups of resource blocks by analyzing the assignment message with the group-specific signaling constraints.

64. A method that facilitates assigning resource blocks of a channel in a wireless communication environment, comprising:
  generating a resource allocation assignment message that includes an explicit indication of one or more groups of resource blocks from which one or more resource blocks are allocated to an access terminal, wherein each of the one or more groups includes a non-overlapping set of resource blocks for allocation to the access terminal;
  transmitting the resource allocation assignment message to the access terminal; and
  signaling the one or more resource blocks that are allocated utilizing respective, group-specific signaling constraints for each of the one or more groups, wherein the group-specific signaling constraints for a respective group indicates the one or more resource blocks that are allocated based at least in part on a respective minimum number of resource block allocation units for that group, and wherein the minimum number of resource block allocation units for each of the one or more groups is dependent on a system bandwidth.

65. The method of claim 64, further comprising indicating physical resource blocks from a set of physical resource blocks included in a selected resource block group of the one or more groups based upon a bitmap size.

66. The method of claim 65, further comprising utilizing an addressing portion of the bitmap to address physical resource blocks in the selected resource block group, wherein each bit in the addressing portion of the bitmap addresses a single addressable physical resource block in the selected resource block group.

67. A wireless communications apparatus, comprising:
a memory that retains instructions related to generating a resource allocation assignment message that includes an explicit indication of one or more groups of resource blocks from which one or more resource blocks are allocated to an access terminal, wherein each of the one or more groups includes a non-overlapping set of resource blocks for allocation to the access terminal, sending the resource allocation assignment message to the access terminal, and signaling the one or more resource blocks that are allocated utilizing respective, group-specific signaling constraints for each of the one or more groups, wherein the group-specific signaling constraints for a respective group indicates the one or more resource blocks that are allocated based at least in part on a respective minimum number of resource block allocation units for that group, and wherein the minimum number of resource block allocation units for each of the one or more groups is dependent on a system bandwidth; and
a processor, coupled to the memory, configured to execute the instructions retained in the memory.

68. The wireless communications apparatus of claim 67, wherein the memory further retains instructions related to indicating physical resource blocks from a set of physical resource blocks included in a selected resource block group of the one or more groups based upon a bitmap size.

69. The wireless communications apparatus of claim 68, wherein the memory further retains instructions related to using an addressing portion of the bitmap to address physical resource blocks in the selected resource block group, wherein each bit in the addressing portion of the bitmap addresses a single addressable physical resource block in the selected resource block group.

70. A wireless communications apparatus that enables signaling resource block assignments in a wireless communication environment, comprising:
means for yielding an assignment message that includes an explicit indication of one or more groups of resource blocks from which one or more resource blocks are allocated to an access terminal, wherein each of the one or more groups includes a non-overlapping set of resource blocks for allocation to the access terminal;
means for transferring the assignment message to the access terminal; and
means for signaling the one or more resource blocks that are allocated utilizing respective, group-specific signaling constraints for each of the one or more groups, wherein the group-specific signaling constraints for a respective group indicates the one or more resource blocks that are allocated based at least in part on a respective minimum number of resource block allocation units for that group, and wherein the minimum number of resource block allocation units for each of the one or more groups is dependent on a system bandwidth.

71. The wireless communications apparatus of claim 70, further comprising means for indicating physical resource blocks from a set of physical resource blocks included in a selected resource block group of the one or more groups based upon a bitmap size.

72. The wireless communications apparatus of claim 71, further comprising means for using an addressing portion of the bitmap to address physical resource blocks in the selected resource block group, wherein each bit in the addressing portion of the bitmap addresses a single addressable physical resource block in the selected resource block group.

73. A non-transitory computer-readable medium storing executable code comprising:
code for yielding an assignment message that includes an explicit indication of one or more groups of resource blocks from which one or more resource blocks are allocated to an access terminal, wherein each of the one or more groups includes a non-overlapping set of resource blocks for allocation to the access terminal;
code for transferring the assignment message to the access terminal; and
code for signaling the one or more resource blocks that are allocated utilizing respective, group-specific signaling constraints for each of the one or more groups, wherein the group-specific signaling constraints for a respective group indicates the one or more resource blocks that are allocated based at least in part on a respective minimum number of resource block allocation units for that group and wherein the minimum number of resource block allocation units for each of the one or more groups is dependent on a system bandwidth.

74. The computer-readable medium of claim 73, further comprising code for indicating physical resource blocks from a set of physical resource blocks included in a selected resource block group of the one or more groups based upon a bitmap size.

75. The computer-readable medium of claim 74, further comprising code for employing an addressing portion of the bitmap to address physical resource blocks in the selected resource block group, wherein each bit in the addressing portion of the bitmap addresses a single addressable physical resource block in the selected resource block group.

76. In a wireless communications system, an apparatus comprising:
a processor configured to:
generate a resource allocation assignment message that includes an explicit indication of one or more groups of resource blocks from which one or more resource blocks are allocated to an access terminal, wherein each of the one or more groups includes a non-overlapping set of resource blocks for allocation to the access terminal;
transmit the resource allocation assignment message to the access terminal; and
signal the one or more resource blocks that are allocated utilizing respective, group-specific signaling constraints for each of the one or more groups, wherein the group-specific signaling constraints for a respective group indicates the one or more resource blocks that are allocated based at least in part on a respective minimum number of resource block allocation units for that group, and wherein the minimum number of resource block allocation units for each of the one or more groups is dependent on a system bandwidth.

77. A method that facilitates receiving resource block assignments in a wireless communication environment, comprising:
- receiving a resource allocation assignment message that includes an explicit indication of one or more groups of resource blocks from which one or more resource blocks are assigned, wherein each of the one or more groups includes a non-overlapping set of resource blocks for assignment to access terminals; and
- determining the one or more assigned resource blocks by deciphering the resource allocation assignment message, wherein the resource allocation assignment message is transferred from a base station utilizing group-specific signaling constraints, wherein the group-specific signaling constraints for a respective group indicates the one or more resource blocks that are assigned based at least in part on a respective minimum number of resource block allocation units for that group, and wherein the minimum number of resource block allocation units for each of the one or more groups is dependent on a system bandwidth.

78. The method of claim 77, further comprising recognizing physical resource blocks from a set of physical resource blocks included in a selected resource block group of the one or more groups based upon a bitmap size.

79. The method of claim 78, wherein an addressing portion of the bitmap addresses physical resource blocks in the selected resource block group, each bit in the addressing portion of the bitmap addresses a single addressable physical resource block in the selected resource block group.

80. A wireless communications apparatus, comprising:
- a memory that retains instructions related to obtaining a resource allocation assignment message that includes an explicit indication of one or more groups of resource blocks from which one or more resource blocks are assigned, wherein each of the one or more groups includes a non-overlapping set of resource blocks for assignment to access terminals, and recognizing the one or more assigned resource blocks by deciphering the resource allocation assignment message, wherein the resource allocation assignment message is transferred from a base station utilizing group-specific signaling constraints, wherein the group-specific signaling constraints for a respective group indicates the one or more resource blocks that are assigned based at least in part on a respective minimum number of resource block allocation units for that group, and wherein the minimum number of resource block allocation units for each of the one or more groups is dependent on a system bandwidth; and
- a processor, coupled to the memory, configured to execute the instructions retained in the memory.

81. The wireless communications apparatus of claim 80, wherein the memory further retains instructions related to recognizing physical resource blocks from a set of physical resource blocks included in a selected resource block group of the one or more groups based upon a bitmap size.

82. The wireless communications apparatus of claim 81, wherein an addressing portion of the bitmap addresses physical resource blocks in the selected resource block group, each bit in the addressing portion of the bitmap addresses a single addressable physical resource block in the selected resource block group.

83. A wireless communications apparatus that enables employing allocated resource blocks in a wireless communication environment, comprising:
- means for obtaining an assignment message that includes an explicit indication of one or more groups of resource blocks from which one or more resource blocks are assigned, wherein each of the one or more groups includes a non-overlapping set of resource blocks for assignment to access terminals; and
- means for evaluating the assignment message to identify the one or more assigned resource blocks, wherein the assignment message is transferred from a base station utilizing group-specific signaling constraints, wherein the group-specific signaling constraints for a respective group indicates the one or more resource blocks that are assigned based at least in part on a respective minimum number of resource block allocation units for that group, and wherein the minimum number of resource block allocation units for each of the one or more groups is dependent on a system bandwidth.

84. The wireless communications apparatus of claim 83, further comprising means for recognizing physical resource blocks from a set of physical resource blocks included in a selected resource block group of the one or more groups based upon a bitmap size.

85. The wireless communications apparatus of claim 84, wherein an addressing portion of the bitmap addresses physical resource blocks in the selected resource block group, each bit in the addressing portion of the bitmap addresses a single addressable physical resource block in the selected resource block group.

86. A non-transitory computer-readable medium storing executable code comprising:
- code for obtaining an assignment message that includes an explicit indication of one or more groups of resource blocks from which one or more resource blocks are assigned, wherein each of the one or more groups includes a non-overlapping set of resource blocks for assignment to access terminals; and
- code for evaluating the assignment message to identify the one or more assigned resource blocks, wherein the assignment message is transferred from a base station utilizing group-specific signaling constraints, wherein the group-specific signaling constraints for a respective group indicates the one or more resource blocks that are assigned based at least in part on a respective minimum number of resource block allocation units for that group and wherein the minimum number of resource block allocation units for each of the one or more groups is dependent on a system bandwidth.

87. The computer-readable medium of claim 86, further comprising code for recognizing physical resource blocks from a set of physical resource blocks included in a selected resource block group of the one or more groups based upon a bitmap size.

88. The computer-readable medium of claim 87, wherein an addressing portion of the bitmap addresses physical resource blocks in the selected resource block group, each bit in the addressing portion of the bitmap addresses a single addressable physical resource block in the selected resource block group.

89. In a wireless communications system, an apparatus comprising:
- a processor configured to:
  receive a resource allocation assignment message that includes an explicit indication of one or more groups of resource blocks from which one or more resource blocks are assigned, wherein each of the one or more groups includes a non-overlapping set of resource blocks for assignment to access terminals; and determine the one or more assigned resource blocks by deciphering the resource allocation assignment message, wherein the resource allocation assignment message is transferred from a base station utilizing group-specific signaling constraints, wherein the group-specific signaling constraints for a respective group indicates the one or more resource blocks that are assigned based at least in part on a respective minimum number of resource block allocation units for that group, and wherein the minimum number of resource block allocation units for each of the one or more groups is dependent on a system bandwidth.

\* \* \* \* \*